(12) United States Patent
Huang

(10) Patent No.: US 10,439,802 B2
(45) Date of Patent: *Oct. 8, 2019

(54) SYSTEM FOR SCRAMBLING AND METHODS FOR USE THEREWITH

(71) Applicant: Lawrence P. Huang, Austin, TX (US)

(72) Inventor: Lawrence P. Huang, Austin, TX (US)

(*) Notice: Subject to any disclaimer, the term of this patent is extended or adjusted under 35 U.S.C. 154(b) by 140 days.

This patent is subject to a terminal disclaimer.

(21) Appl. No.: 15/814,144

(22) Filed: Nov. 15, 2017

(65) Prior Publication Data

US 2018/0083775 A1   Mar. 22, 2018

Related U.S. Application Data

(63) Continuation-in-part of application No. 13/858,444, filed on Apr. 8, 2013, now Pat. No. 9,871,654, which is a continuation of application No. 12/850,324, filed on Aug. 4, 2010, now Pat. No. 8,437,471.

(51) Int. Cl.
| | | |
|---|---|---|
| *G06F 21/00* | (2013.01) | |
| *H04L 9/08* | (2006.01) | |
| *H04L 9/06* | (2006.01) | |
| *H04L 9/00* | (2006.01) | |
| *G09C 1/00* | (2006.01) | |

(52) U.S. Cl.
CPC ............. *H04L 9/0816* (2013.01); *G09C 1/00* (2013.01); *H04L 9/001* (2013.01); *H04L 9/0618* (2013.01); *H04L 9/0662* (2013.01); *H04L 2209/12* (2013.01); *H04L 2209/34* (2013.01)

(58) Field of Classification Search
CPC .................................................... H04L 9/0816
USPC .......................................................... 380/46
See application file for complete search history.

(56) References Cited

U.S. PATENT DOCUMENTS

| | | | | |
|---|---|---|---|---|
| 7,242,772 B1* | 7/2007 | Tehranchi | ............ | H04N 7/1675 |
| | | | | 348/E7.056 |
| 7,277,543 B1* | 10/2007 | Driscoll | ................ | H04L 9/0662 |
| | | | | 380/262 |
| 7,545,928 B1 | 6/2009 | Goh | | |
| 7,809,266 B2* | 10/2010 | Lee | ........................ | H04K 1/02 |
| | | | | 398/68 |
| 2002/0018565 A1 | 2/2002 | Luttrell et al. | | |
| 2003/0053625 A1* | 3/2003 | Bially | .................... | H04L 9/0631 |
| | | | | 380/42 |
| 2004/0071289 A1* | 4/2004 | Rose | ...................... | H04L 9/0668 |
| | | | | 380/37 |
| 2006/0023875 A1* | 2/2006 | Graunke | .................. | H04L 9/065 |
| | | | | 380/28 |

(Continued)

*Primary Examiner* — Harris C Wang

(74) *Attorney, Agent, or Firm* — Garlick & Markison; Bruce E. Stuckman

(57) ABSTRACT

Processing circuitry includes key store hardware that stores a plurality of encryption keys. Key stream generator hardware generates a plurality of key streams from the plurality of encryption keys, wherein each key stream comprises a repeating stream of key data. Key river generator hardware generates a key river by parallelizing the plurality of key streams as key river symbols, wherein bits from each key river symbol are selected from each key stream as individual bits from differing ones of the plurality of encryption keys. Binary processor hardware generates a key path as a sequence of binary digits generated from at least one binary function of the key river.

20 Claims, 20 Drawing Sheets

(56) References Cited

U.S. PATENT DOCUMENTS

| | | | | |
|---|---|---|---|---|
| 2008/0298583 | A1* | 12/2008 | Ahmed | H04L 9/065 380/46 |
| 2009/0103726 | A1* | 4/2009 | Ahmed | H04L 9/0668 380/46 |
| 2009/0316885 | A1* | 12/2009 | Mahmud | G06F 17/2258 380/28 |
| 2013/0272519 | A1* | 10/2013 | Huang | H04L 9/001 380/44 |

* cited by examiner

US 10,439,802 B2

SYSTEM FOR SCRAMBLING AND METHODS FOR USE THEREWITH

CROSS REFERENCE TO RELATED PATENTS

The present U.S. Utility Patent Application claims priority pursuant to 35 U.S.C. § 120 as a continuation-in-part of U.S. Utility application Ser. No. 13/858,444, entitled "SYSTEM FOR SCRAMBLING AND METHODS FOR USE THEREWITH", filed Apr. 8, 2013, which is a continuation of U.S. Utility application Ser. No. 12/850,324, entitled "SYSTEM FOR SCRAMBLING AND METHODS FOR USE THEREWITH", filed Aug. 4, 2010, issued as U.S. Pat. No. 8,437,471 on May 7, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates to generally devices that prevent unauthorized access to data.

Description of Related Art

Encryption and other scrambling techniques are frequently used to protect data from unauthorized access. In particular, data is scrambled so as to make it unintelligible to ordinary observers. However, the scrambling is performed in a systematic way so that an intended recipient or other authorized party can descramble the scrambled data to recover the original data. Encryption can be included in a data communication protocol in order to protect communications. Examples include secure socket layer (SSL), transport layer security (TLS), WiFi Protected Access (WPA), etc. Data can also be secured when stored to protect the data from being read by those without authorization to access the data.

For example, Rivest, Shamir, Adelman (RSA) encryption is an example of a public key cryptographic algorithm that is used to secure communications, and stored data, in association with financial transactions, etc. The RSA algorithm scrambles data content using the public key but requires knowledge of a private key in order for the data to be decrypted to recover the original data. Further examples of scrambling techniques include AES (advanced encryption standard), DES (data encryption standard), 3DES, Multi-2 encryption, DVB (digital video broadcasting), C2 (cryptomeria cipher), CSS (content scramble system), MDMI (HDCP), 1394 (M6), and ECC (elliptical curve cryptography).

The limitations and disadvantages of conventional and traditional approaches will become apparent to one of ordinary skill in the art through comparison of such systems with the present invention.

BRIEF DESCRIPTION OF THE SEVERAL VIEWS OF THE DRAWING(S)

DETAILED DESCRIPTION OF THE INVENTION

Figure 1:
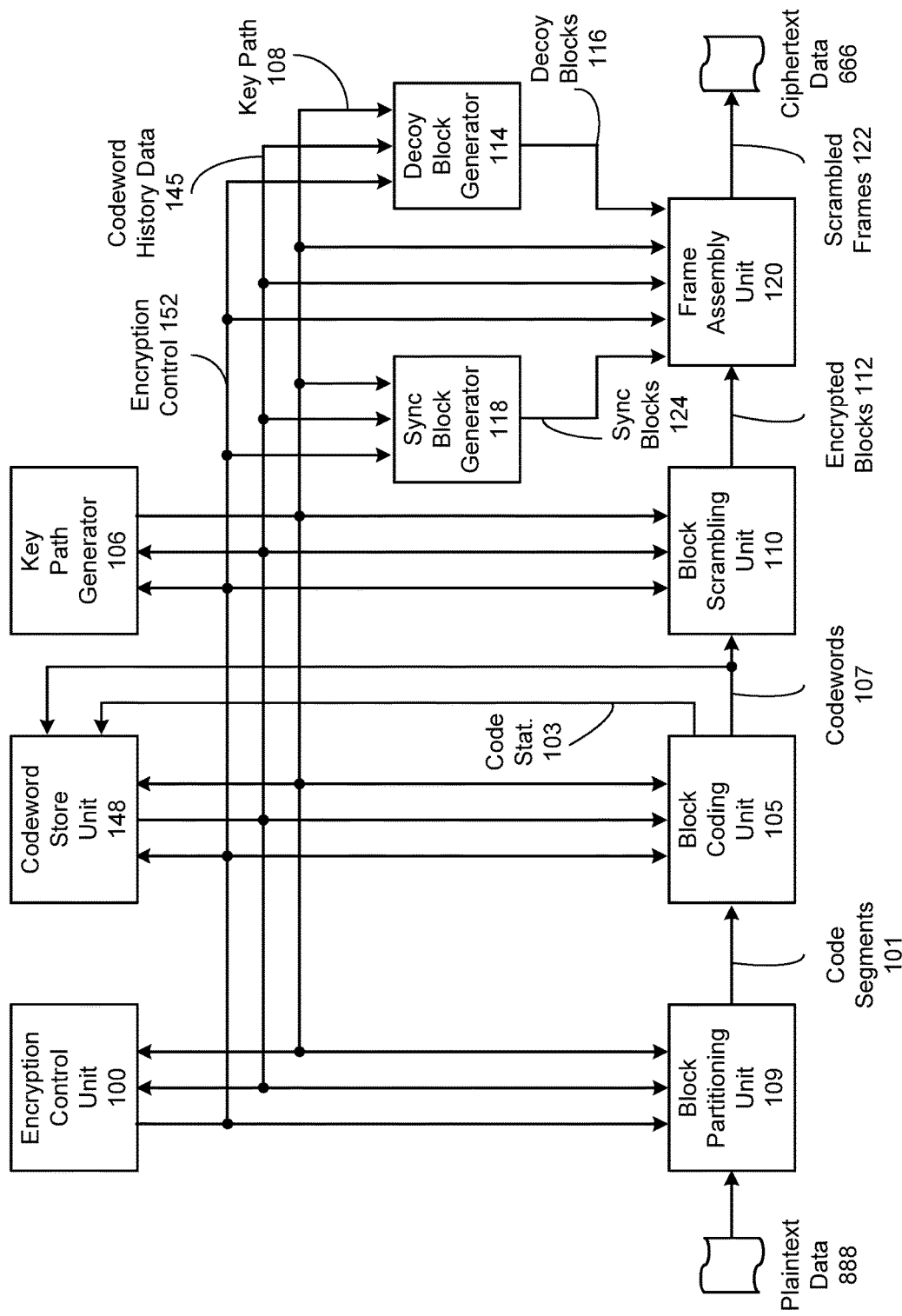
FIG. 1 is a schematic block diagram of an embodiment of a system in accordance with the present invention.

FIG. 1 is a schematic block diagram of an embodiment of a system in accordance with the present invention. In particular, a system is presented for scrambling an input plaintext data 888 into an output ciphertext data 666. The system includes encryption control unit 100, block partitioning unit 109, block coding unit 105, block scrambling unit 110, sync block generator 118, decoy block generator 114, frame assembly unit 120, codeword store unit 148 and key path generator 106. Plaintext data 888 can represent user data to be communicated or stored in a secure fashion, such as financial data, personal information, business information, passwords, or other proprietary data. Further, plaintext data 888 can represent third party proprietary data such as movies, books, audio or other media data, proprietary computer system information, etc. In short, plaintext data 888 can include any kind of data that one wishes to prevent unauthorized persons from using.

The encryption control unit 100, block partitioning unit 109, block coding unit 105, block scrambling unit 110, sync block generator 118, decoy block generator 114, frame assembly unit 120, codeword store unit 148 and key path generator 106 can each be implemented via single processing device or a plurality of processing devices. Such a processing device may be a dedicated or shared microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing device may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, a memory element can store, and the processing device can execute, hard coded and/or operational instructions corresponding to at least some of the steps and/or functions attributed to encryption control unit 100, block partitioning unit 109, block coding unit 105, block scrambling unit 110, sync block generator 118, decoy block generator 114, frame assembly unit 120, codeword store unit 148 and key path generator 106.

In operation, block partitioning unit 109 generates a plurality of code segments 101 from processing plaintext data 888. An optional pre-processing portion of the system shown in FIG. 1 intertwines random data with the user data within block partitioning unit 109. Random data may or may not be present in each code segment 101 to further confound the efforts of an unauthorized user attempting to isolate and identify user data from the code segments. In an embodiment of the present invention, the size of code segments 101 and the content mixture and location of plaintext data and/or random data contained within code segments 101 operate in accordance with repeatable functions that can be duplicated by the authorized users, but that are unknown to unauthorized users. As previously discussed, the plaintext data 888 can be a password. The block partitioning hardware 109 receives the password and partitions the password into n password segments $P_1, P_2, \ldots P_n$ based on the key path and/or as a function of the password itself. For example, the password segments $P_1, P_2, \ldots P_n$ can have differing lengths, based on the key path and/or, as a function of the password. Furthermore, the total number of password segments n can be a function of the keypath and/or password.

Block coding unit 105 generates each of the plurality of codewords 107 based on one of the plurality of code segments 101. In an embodiment of the present invention, the block coding unit 105 implements a linear block code such as a Golay code, Reed Soloman code, BCH code, or other error correcting code that is able to correct up to a certain number of bit errors—the codeword decoding threshold. It should be noted that other block codes could also be used. Also in an embodiment of the present invention, the selection of a linear block code, the size of the codeword and the codeword decoding threshold level operate in accordance with repeatable functions that can be duplicated by the authorized users, but that are unknown to unauthorized users.

Key path generator 106 generates a key path 108, based on a plurality of encryption keys, that includes a key path sequence. In an embodiment of the present invention, key path generator 106 operates in accordance with repeatable functions that can be duplicated by the authorized users, but that are unknown to unauthorized users.

Codeword store unit 148 generates codeword history data 145 based on the plurality of past codewords 107 and code statuses 103. For example, the codeword store unit 148 may include a finite impulse response filter, an infinite impulse response filter, an exponentially weighted moving average or other function that includes a "memory" of one or more past values of the codewords 107 and code statuses 103. In this fashion, the codeword history data 145 is a function of one or more of these past values. In an embodiment of the present invention, codeword store unit 148 operates in accordance with repeatable functions that can be duplicated by the authorized users, but that are unknown to unauthorized users.

Block scrambling unit 110 generates each of the plurality of encrypted blocks 112 by entropy processing, key chaos processing, data chaos processing and permutation processing one of the plurality of codewords 107. Entropy processing is the introduction of recoverable random errors into a codeword. Key chaos processing is the introduction of a key path traversal into a codeword. Data chaos processing is the introduction of the codeword history into a codeword. Permutation processing is the re-ordering of a codeword. The use of entropy, key chaos, data chaos and permutation processing in combination provides a greater level of security that any one of these techniques when used alone. In an embodiment of the present invention, the order and manner of entropy, key chaos, data chaos and permutation processing operate in accordance with repeatable functions that can be duplicated by the authorized users, but that are unknown to unauthorized users.

Figure 2:
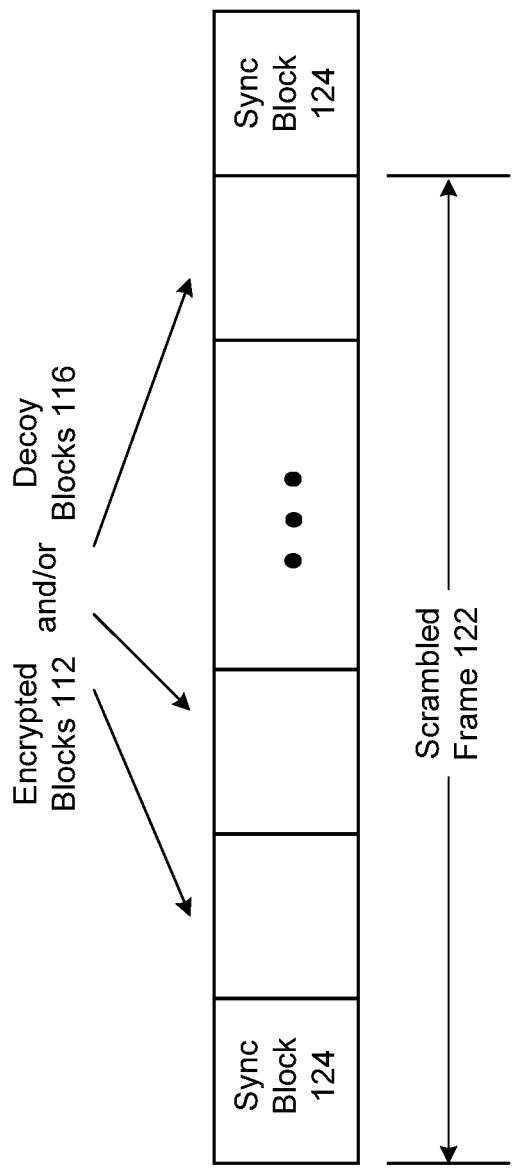
FIG. 2 is a block diagram of an embodiment of a scrambled frame of data in accordance with the present invention.

Sync block generator 118, decoy block generator 114 and frame assembly unit 120 are an optional post-processing portion of the system shown in FIG. 1. In particular, encrypted blocks 112 are assembled into scrambled frames 122 for communication either alone or via one or other frame or packet-based communication protocols. Additionally, scrambled frames 122 could be stored on various storage mediums such as a read-only memory, random access memory, volatile memory, non-volatile memory, static memory, dynamic memory, flash memory, cache memory, and/or any device that stores digital information. FIG. 2 is a block diagram of an embodiment of a scrambled frame of data in accordance with the present invention. The aggregation of the plurality of scrambled frames 122 forms the output ciphertext data 666. In different embodiments of the present invention that do not include this optional post-processing portion, the aggregation of the plurality of encrypted blocks 112 forms the output ciphertext data 666.

In operation, sync block generator 118 generates a sync block 124 used for synchronizing communication and/or storage of the scrambled frames 122. Decoy block generator 114 generates decoy blocks 116 that include an amount of random data of deterministic length. In an embodiment of the present invention, the size of a decoy block 116 operates in accordance with repeatable functions that can be duplicated by the authorized users, but that are unknown to unauthorized users. Frame assembly unit 120 generates a scrambled frame 122 based on a plurality of encrypted blocks 112, a plurality of decoy blocks 116 and a sync block 124 as shown, for example in FIG. 2. In particular sync block 124 includes a preamble or other readily recognizable data pattern or sequence that can be used to determine the beginning of the frame, and further can be used to demarcate the encrypted blocks 112 and decoy blocks 116 that are contained within a frame. As discussed, the encrypted blocks 112 may each be based on a mixture of user data from plaintext data 888 and random data. Decoy blocks 116 may or may not be included in each scrambled frame 122 to further confound the efforts of an unauthorized user attempting to isolate and descramble the encrypted blocks 112 from the scrambled frames 122. In an embodiment of the present invention, the number and location of decoy blocks 116 and encrypted blocks 112 within a scrambled frame 122 operate in accordance with repeatable functions that can be duplicated by the authorized users, but that are unknown to unauthorized users. Also in an embodiment of the present invention, the frame assembly sequence of sync blocks 124, encrypted blocks 112 and decoy blocks 116 operate in accordance with repeatable functions that can be duplicated by the authorized users, but that are unknown to unauthorized users.

Encryption control unit 100 controls and sequences the operation of the system, as shown for example in FIG. 1, in processing input plaintext data 888 to generate output ciphertext data 666. Within encryption control unit 100, one or more controllers, implemented as state machines, automata structures or other control devices, generate encryption control 152 based on the current states of the controllers, the key path 108 and the codeword history data 145. The control functions of encryption control unit 100 can be centralized, as shown in FIG. 1, distributed among the other units and generators in the system or some combination thereof. Based on the distribution of control, the granularity of encryption control 152 can be abstract, e.g., the number of encrypted blocks per scrambled frames, detailed, e.g., the symbol size of a codeword or control of a data selector, or some combination thereof. In an embodiment of the present invention, encryption control unit 100 operates in accordance with repeatable functions that can be duplicated by the authorized users, but that are unknown to unauthorized users.

In an embodiment of the present invention, the system, as shown for example in FIG. 1, operates in a manner such that characteristics and attributes of code segments 101, codewords 107, encrypted blocks 112, decoy blocks 116 and scrambled frames 112 vary in processing input plaintext data 888 in accordance with repeatable functions that can be duplicated by the authorized users, but that are unknown to unauthorized users. Thus for example, characteristics and attributes of a specific codeword 107, such as the mixture and location of plaintext data and random data, the size of the codeword, the selection of a linear block code and the codeword decoding threshold level, are different from previous codewords 107 and subsequent codewords 107. This further confounds the efforts of an unauthorized user attempting to isolate and descramble elements of the plaintext data 888 from the scrambled ciphertext data 666.

Further details, including example implementations and many optional functions and features are presented in conjunction with FIGS. 3-20 that follow.

Figure 3:
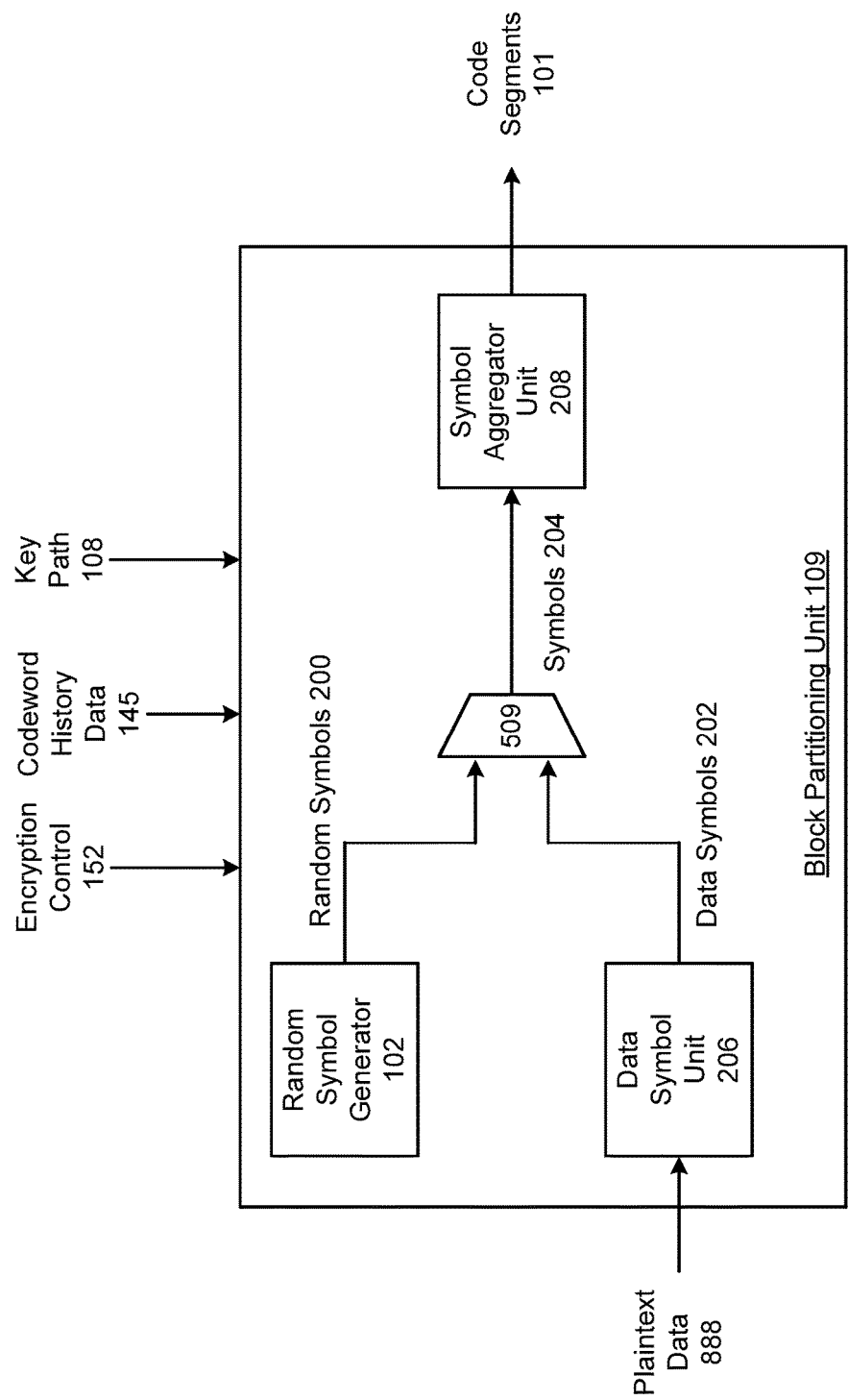
FIG. 3 is a schematic block diagram of an embodiment of a block partitioning unit 109 in accordance with the present invention.

FIG. 3 is a schematic block diagram of an embodiment of a block partitioning unit 109 in accordance with the present invention. In particular, an optional pre-processing portion is presented to be used in conjunction with a system that includes symbol selector 509 and random symbol generator 102.

Random symbol generator 102 includes a source of random data or pseudo-random data such as a feedback shift register such as a linear feedback shift register or other random or pseudo-random number generator. In operation, random symbol generator 102 generates a plurality of random symbols 200 and data symbol unit 206 converts plaintext data 888 into a plurality of data symbols 202. Symbol selector 509, implemented via a multiplexer as shown or other control circuit, selects each of the plurality of symbols 204 as either one of the plurality of random symbols 200 or one of a plurality of user data symbols 202 based on the key path 108, the codeword history data 145 and the encryption control 152. In this fashion, random symbols 200 are interspersed with user data symbols 202 to further confound the efforts of an unauthorized user attempting to isolate and descramble the data symbols 202 from the encrypted blocks 112. Symbol aggregator unit 208 aggregates a plurality of symbols 204 to form each of the plurality of code segments 101 based on the key path 108, the codeword history data 145 and the encryption control 152. In an embodiment of the present invention, random symbol generator 102, data symbol generator 206, symbol selector 509 and symbol aggregator unit 208 operate in accordance with repeatable functions that can be duplicated by the authorized users, but that are unknown to unauthorized users. Also in an embodiment of the present invention, the sizes of random symbols 200 and data symbols 202 as generated by random symbol generator 102 and data symbol unit 206 operate in accordance with repeatable functions that can be duplicated by the authorized users, but that are unknown to unauthorized users. Also in an embodiment of the present invention, the number of symbols 204 aggregated by symbol aggregator unit 208 to form each of the plurality of code segments 101 operate in accordance with repeatable functions that can be duplicated by the authorized users, but that are unknown to unauthorized users.

Figure 4:
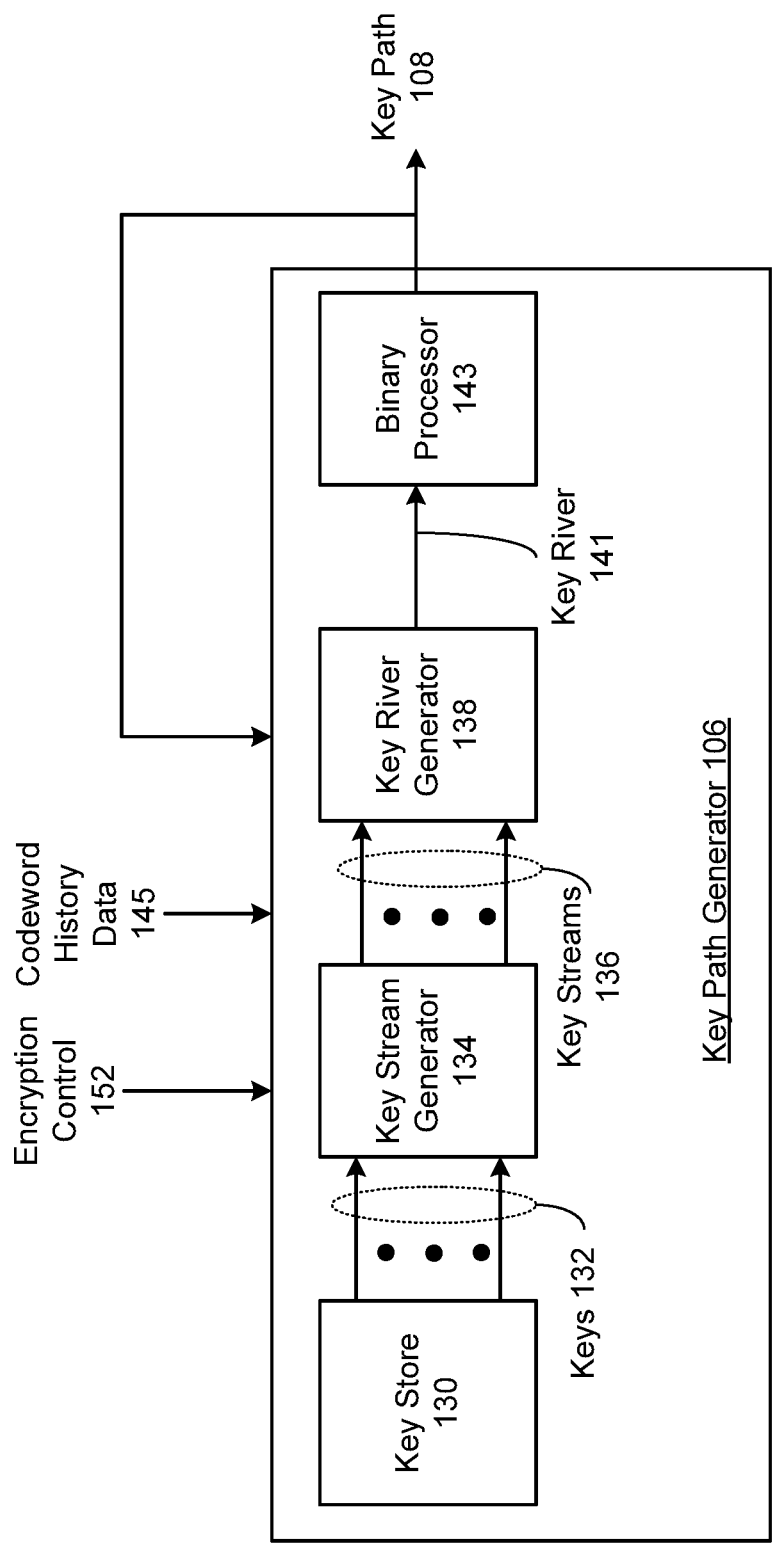
FIG. 4 is a schematic block diagram of an embodiment of a key path generator 106 in accordance with the present invention.

FIG. 4 is a schematic block diagram of an embodiment of a key path generator 106 in accordance with the present invention. In particular, a key store 130, such as a secure memory or other memory, stores a plurality of keys 132 that may be, for example, binary numbers of the same length or may include one or more keys 132 of different lengths. The key stream generator 134 generates a plurality of key streams 136 from the plurality of keys 132. For example, the key stream generator 134 may repeat each key 132 to create a corresponding key stream 136. In further embodiments, the key stream generator 134 is implemented via hardware or software that includes a plurality of pseudo-random number generators, such as linear feedback shift registers or other pseudo-random number generators. Each of the pseudo-random number generators is coupled to receive a corresponding one of the plurality of encryption keys, and the components, segments or other portions of the plurality of encryption keys each specify an initial seed value of one of the plurality of pseudo-random number generators.

The key river generator 138 generates a key river 141 by parallelizing the plurality of key streams 136. For example, given a system with k keys 132 and k key streams 136, key river generator 138 outputs a plurality of k-bit symbols, where each bit comes from one of the corresponding k keys 132 and k key streams 136. In various embodiments, the key river generator hardware 138 also implements a permutation transformation function that permutes an ordering of the bits of each key river symbol. Binary processor 143 generates a key path 108 as, for instance, a sequence of binary digits generated based on a binary function of the key river 141. In this fashion, the key path 108 includes information derived from each of the k keys 132. For example, the binary function of the key river 141 can include a plurality of binary functions of the key river 141, each having an output, and the binary processor hardware 143 includes a selector that selects the output from a selected one of the plurality of binary functions, based on components of the key river 141.

While the foregoing has discussed the use of a key store 130, it should be noted that at least one of the plurality of key streams 136 can be generated by a linear feedback shift register of length n that generates a key stream as a sequence of binary digits that repeat, for example, every $2^n-1$ digits.

As shown, the operation of one or more components of the key path generator 106 can be modified based on the encryption control 152, codeword history data 145 and/or feedback from the key path 108 itself. For example, the number of keys, one or more key seeds, the selection of particular keys and/or the size of the keys used by the key store 130 and/or the key stream generator 134, a parallelization function or permutation function used by key river generator 138, and/or the selection of a binary function by the binary processor 143 can be modified based on one or more deterministic functions known by the key path generator 106 and common to a similar unit used for descrambling/decryption in a reciprocal fashion to dynamically alter the key path generation process. This can increase an attack complexity, particular when feedback in the form of codeword history data 145 is used—since the codeword history data 145 itself, is a function of the keys, plaintext and/or previous dynamic randomness via the various components of the block partitioning unit 109, block coding unit 105, block scrambling unit 110, sync block generator 118, decoy block generator 114 and/or frame assembly unit 120.

Figure 5:
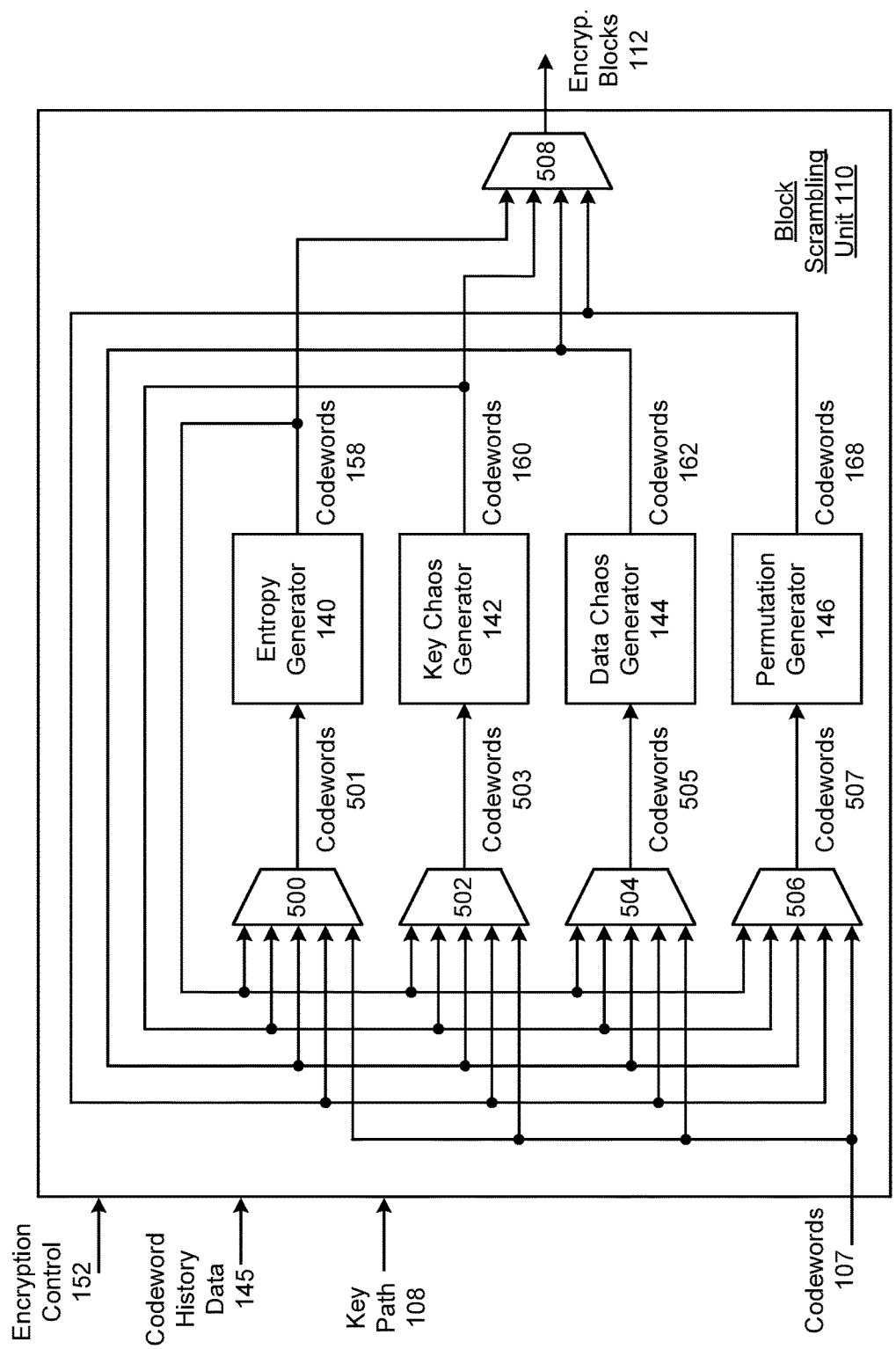
FIG. 5 is a schematic block diagram of an embodiment of a block scrambling unit 110 in accordance with the present invention.

FIG. 5 is a schematic block diagram of an embodiment of block scrambling unit 110 in accordance with the present invention. As shown, the block scrambling unit 110 includes codeword selector 500, entropy generator 140, codeword selector 502, key chaos generator 142, codeword selector 504, data chaos generator 144, codeword selector 506, permutation generator 146 and codeword selector 508. As discussed in conjunction with FIG. 1, the block scrambling unit 110 scrambles each of the plurality of codewords 107 to generate one of the plurality of encrypted blocks 112. In an embodiment of the present invention, block scrambling unit 110 operates in accordance with repeatable functions that can be duplicated by the authorized users, but that are unknown to unauthorized users.

Codeword selector 500, implemented via a multiplexer as shown or other control circuit, selects each of the plurality of codewords 501 to be processed by the entropy generator 140 as either one of the plurality of codewords 107 or one of the plurality of entropy coded codewords 158 or one of the plurality of key chaos coded codewords 160 or one of the plurality of data chaos coded codewords 162 or one of the plurality of permutated coded codewords 168 based on the key path 108, the codeword history data 145 and the encryption control 152. Entropy generator 140 inserts a random number of recoverable random errors in each of the plurality of codewords 501, for instance, the number of errors inserted in each codeword 501 can be greater than or equal to zero and less than the codeword decoding threshold, to entropy process each of the plurality of codewords 501 and generate one of the plurality of entropy coded codewords 158. In an embodiment of the present invention, codeword selector 500 operates in accordance with repeatable functions that can be duplicated by the authorized users, but that are unknown to unauthorized users.

Codeword selector 502, implemented via a multiplexer as shown or other control circuit, selects each of the plurality of codewords 503 to be processed by the key chaos generator 142 as either one of the plurality of codewords 107 or one of the plurality of entropy coded codewords 158 or one of the plurality of key chaos coded codewords 160 or one of the plurality of data chaos coded codewords 162 or one of the plurality of permutated coded codewords 168 based on the key path 108, the codeword history data 145 and the encryption control 152. Key chaos generator 142 operates to key chaos process each of the plurality of codewords 503 based on the key path 108, the codeword history data 145 and the encryption control 152 to generate one of the plurality of key chaos coded codewords 160. In an embodiment of the present invention, codeword selector 502 operates in accordance with repeatable functions that can be duplicated by the authorized users, but that are unknown to unauthorized users.

Codeword selector 504, implemented via a multiplexer as shown or other control circuit, selects each of the plurality of codewords 505 to be processed by the data chaos generator 144 as either one of the plurality of codewords 107 or one of the plurality of entropy coded codewords 158 or one of the plurality of key chaos coded codewords 160 or one of the plurality of data chaos coded codewords 162 or one of the plurality of permutated coded codewords 168 based on the key path 108, the codeword history data 145 and the encryption control 152. Data chaos generator 144 operates to data chaos process each of the plurality of codewords 505 based on the key path 108, the codeword history data 145 and the encryption control 152 to generate one of the plurality of data chaos coded codewords 162. In an embodiment of the present invention, codeword selector 504 operates in accordance with repeatable functions that can be duplicated by the authorized users, but that are unknown to unauthorized users.

Codeword selector 506, implemented via a multiplexer as shown or other control circuit, selects each of the plurality of codewords 507 to be processed by the permutation generator 146 as either one of the plurality of codewords 107 or one of the plurality of entropy coded codewords 158 or one of the plurality of key chaos coded codewords 160 or one of the plurality of data chaos coded codewords 162 or one of the plurality of permutated coded codewords 168 based on the key path 108, the codeword history data 145 and the encryption control 152. Permutation generator 146 permutes each of the plurality of codewords 507 based on the key path 108, the codeword history data 145 and the encryption control 152 to generate one of the plurality of permutated coded codewords 168. In an embodiment of the present invention, codeword selector 506 operates in accordance with repeatable functions that can be duplicated by the authorized users, but that are unknown to unauthorized users.

Codeword selector 508, implemented via a multiplexer as shown or other control circuit, selects each of the plurality of encrypted blocks 112 as either one of the plurality of entropy coded codewords 158 or one of the plurality of key chaos coded codewords 160 or one of the plurality of data chaos coded codewords 162 or one of the plurality of permutated coded codewords 168 based on the key path 108, the codeword history data 145 and the encryption control 152. In an embodiment of the present invention, codeword selector 508 operates in accordance with repeatable functions that can be duplicated by the authorized users, but that are unknown to unauthorized users.

The use of the codeword history data 145 and key path 108 in the key chaos, data chaos and permutation processing further confound the efforts of an unauthorized user attempting to isolate and descramble the data symbols 202 from the encrypted blocks 112. In particular, knowledge of each of the k keys 132 and the ultimate key path 108 and proper processing of prior codewords will be required for descrambling.

While the description above and much of the description that follows, is based on a particular order for the operations of entropy processing, key chaos processing, data chaos processing and permutation, it should be noted that these operations could be presented in different dynamic orders—as long as the order used in scrambling is reversed in the descrambling operation to be described later.

Figure 6:
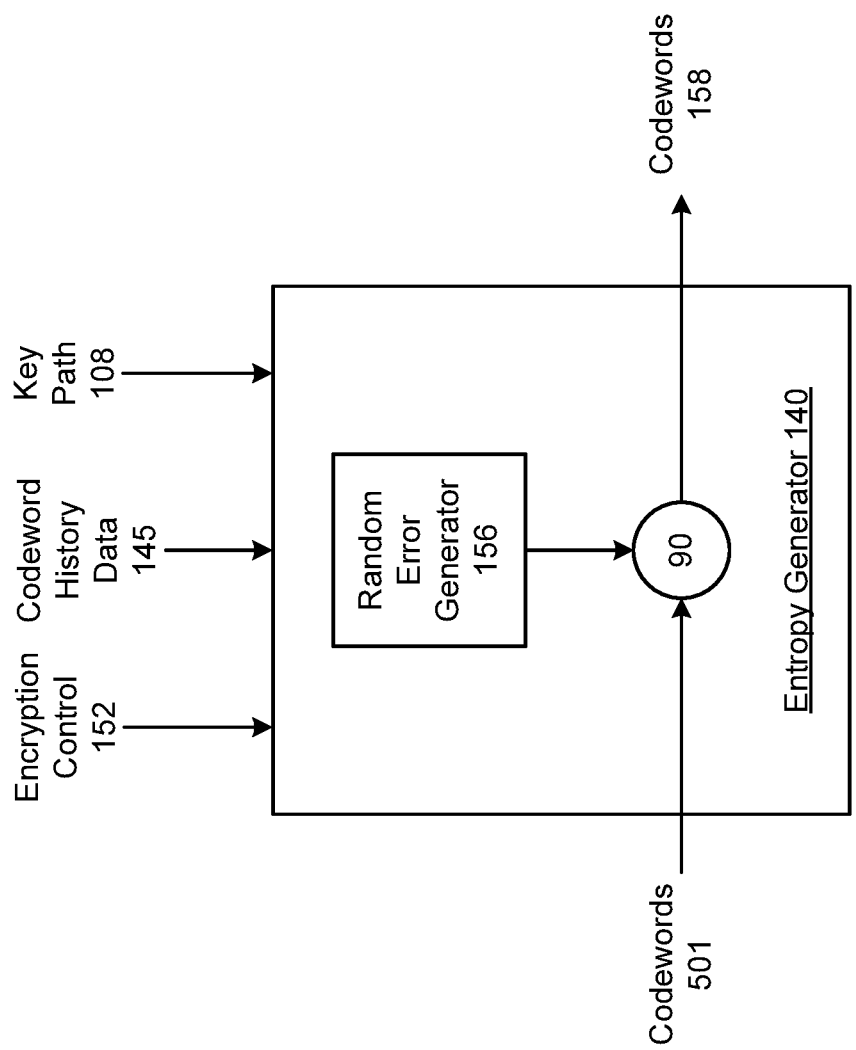
FIG. 6 is a schematic block diagram of an embodiment of an entropy generator 140 in accordance with the present invention.

FIG. 6 is a schematic block diagram of an embodiment of entropy generator 140 in accordance with the present invention. Entropy generator 140 generates each of the plurality of codewords 158 by inserting a random number of recoverable random errors in one of the plurality of codewords 501, wherein the number of errors can be greater than or equal to zero and less than the codeword decoding threshold. In particular, random error generator 156 generates the errors for each codeword in a random, pseudorandom or other pattern and inserts the errors in each codeword 501 via a combiner unit 90. The combiner unit can be implemented via an exclusive-or function, bit toggling or other function that inserts the number bit errors at the locations determined by random error generator 156. In an embodiment of the present invention, the codeword decoding threshold and combiner unit 90 operates in accordance with repeatable functions that can be duplicated by the authorized users, but that are unknown to unauthorized users.

Figure 7:
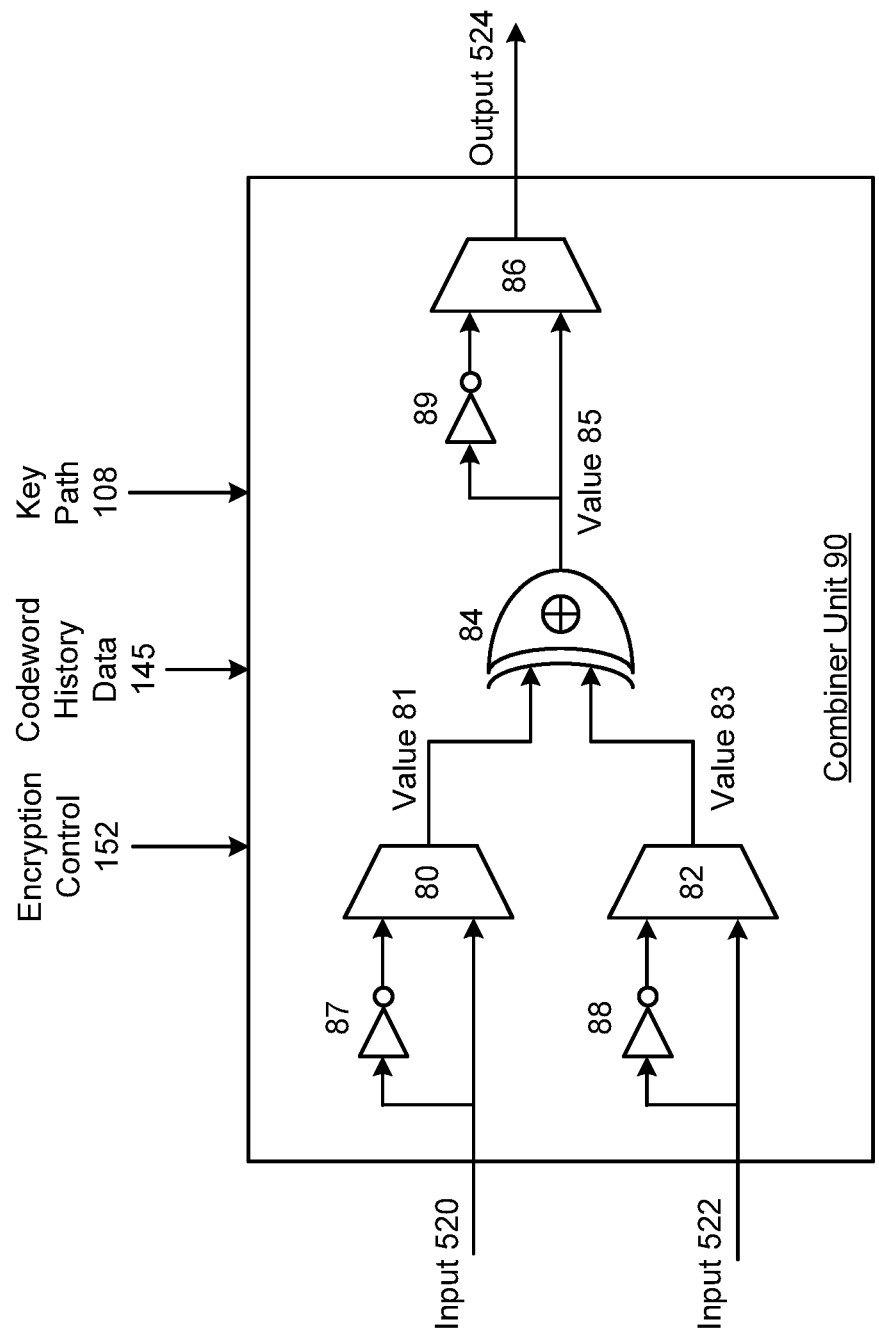
FIG. 7 is a schematic block diagram of an embodiment of a combiner unit 90 in accordance with the present invention.

FIG. 7 is a schematic block diagram of an embodiment of combiner unit 90 in accordance with the present invention. As shown, the combiner unit 90 includes logical inverter function 87, data selector 80, logical inverter function 88, data selector 82, logical exclusive-or function 84, logical inverter function 89 and data selector 86. In this embodiment, data selector 80 selects each of the plurality of values 81 as either one of the plurality of inputs 520 or one of the plurality of the logical compliment of inputs 520 via logical inverter function 87 based on the key path 108, the codeword history data 145 and encryption control 152. Similarly, data selector 82 selects each of the plurality of values 83 as either one of the plurality of inputs 522 or one of the plurality of the logical compliment of inputs 522 via logical inverter function 88 based on the key path 108, the codeword history data 145 and encryption control 152. Exclusive-or function 84 generates each of the plurality of exclusive-or result values 85 from applying the exclusive-or function over one of the plurality of values 81 and one of the plurality of values 83. Finally, data selector 86 selects each of the plurality of outputs 524 as either one of the plurality of values 85 or one of the plurality of the logical compliment of values 85 via logical inverter function 89 based on the key path 108, the codeword history data 145 and encryption control 152. In an embodiment of the present invention, data selector 80, data selector 82 and data selector 86 operate in accordance with repeatable functions that can be duplicated by the authorized users, but that are unknown to unauthorized users.

Figure 8:
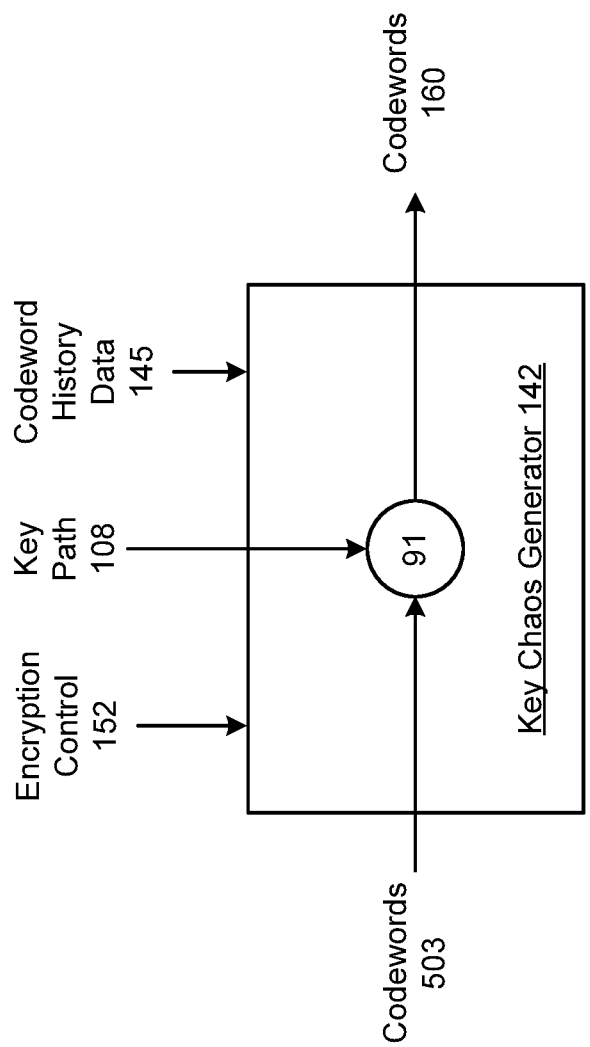
FIG. 8 is a schematic block diagram of an embodiment of a key chaos generator 142 in accordance with the present invention.

FIG. 8 is a schematic block diagram of an embodiment of key chaos generator 142 in accordance with the present invention. In this embodiment, the key chaos generator 142 forms each of the plurality of key chaos coded codewords 160 by simply encrypting one of the plurality of codewords 503 via keypath 108 based on the key path 108, the codeword history data 145 and encryption control 152. In particular, key chaos generator 142 combines, via combiner unit 91, each bit of the key path 108 with a bit of each codeword 503. Combiner 91 shown in FIG. 8 operates in a similar fashion to combiner 90 shown in FIG. 7. In other embodiments of the present invention, other encryption methodologies could be used at this step including AES (advanced encryption standard), DES (data encryption standard), 3DES, etc. In an embodiment of the present invention, combiner unit 91 operates in accordance with repeatable functions that can be duplicated by the authorized users, but that are unknown to unauthorized users.

Figure 9:
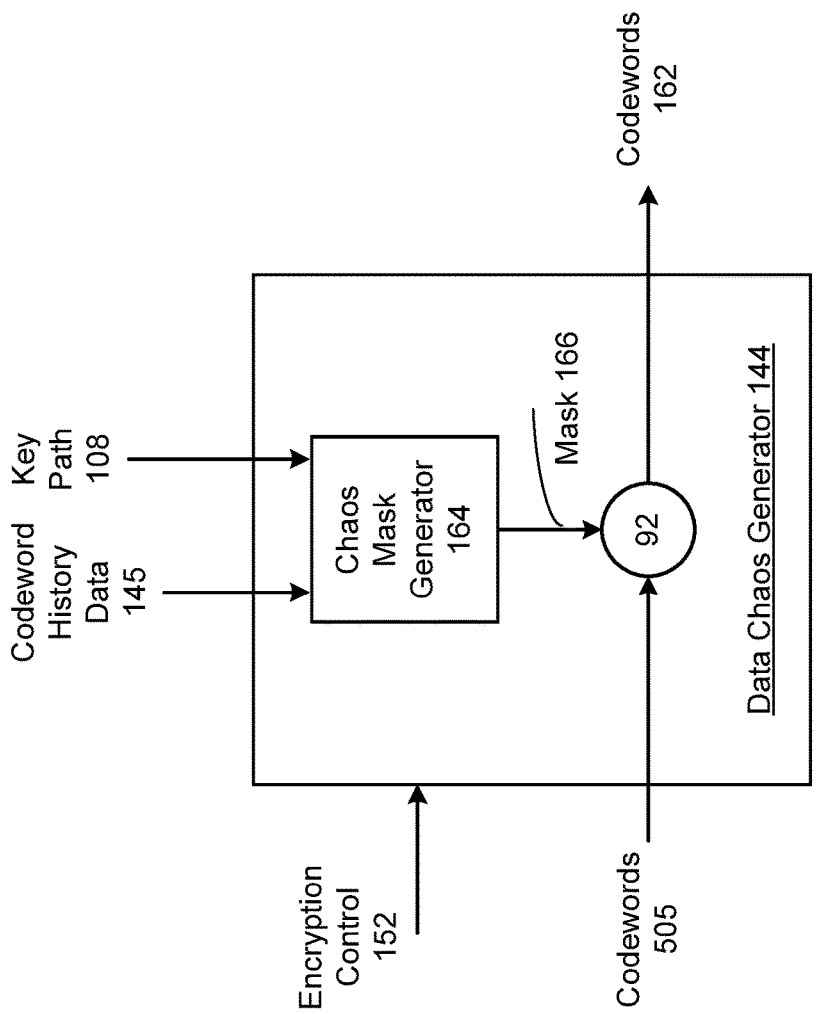
FIG. 9 is a schematic block diagram of an embodiment of a data chaos generator 144 in accordance with the present invention.

FIG. 9 is a schematic block diagram of an embodiment of data chaos generator 144 in accordance with the present invention. In particular, data chaos generator 144 includes a chaos mask generator 164 that generates each of the plurality of mask data 166 based on the key path 108, the codeword history data 145 and encryption control 152. In an embodiment of the present invention, the data chaos generator 144 generates each of the plurality of data chaos coded codewords 162 by corrupting one of the plurality of codewords 505 based on one of the plurality of mask data 166. For instance, the mask data 166 indicates the position of each of plurality of bit errors that are inserted in the codeword 505 via combiner unit 92 to form codeword 162. Combiner 92 shown in FIG. 9 operates in a similar fashion to combiner 90 shown in FIG. 7 based on the key path 108, the codeword history data 145 and encryption control 152. In an embodiment of the present invention, chaos mask generator 164 and combiner unit 92 operate in accordance with repeatable functions that can be duplicated by the authorized users, but that are unknown to unauthorized users.

Figure 10:
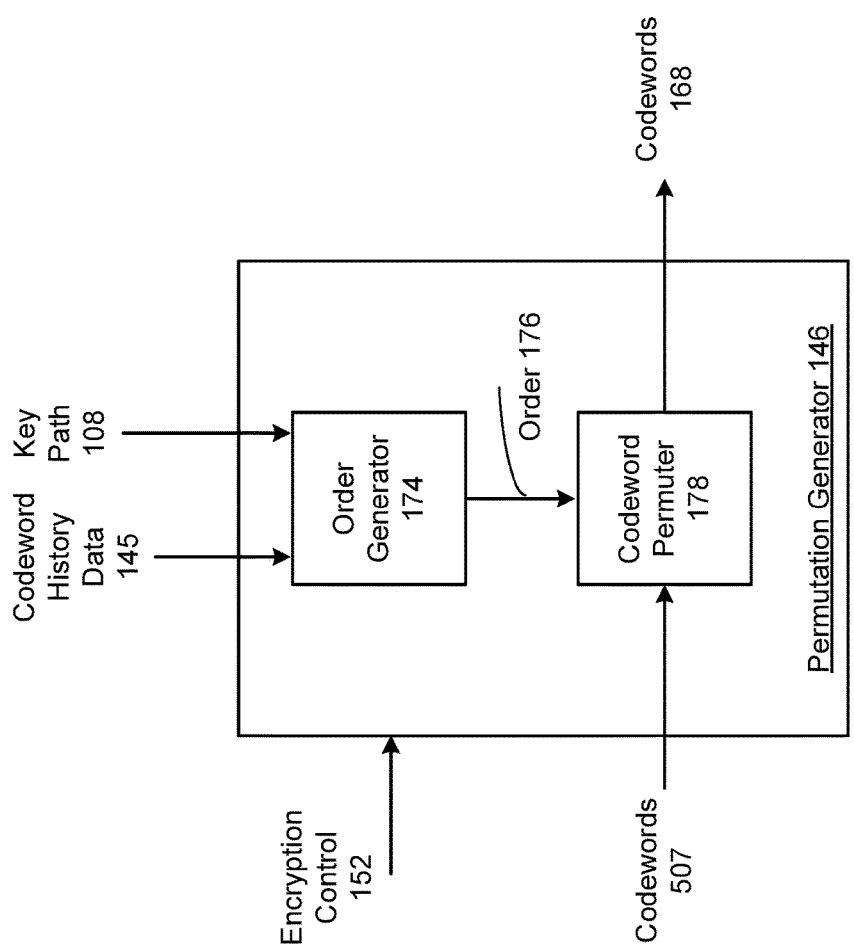
FIG. 10 is a schematic block diagram of an embodiment of a permutation generator 146 in accordance with the present invention.

FIG. 10 is a schematic block diagram of an embodiment of permutation generator 146 in accordance with the present invention. In particular, permutation generator 146 includes an order generator 174 that generates each of the plurality of permutation orders 176 based on the key path 108, the codeword history data 145 and encryption control 152. In an embodiment of the present invention, the permutation generator 146 generates each of the plurality of codewords 168 via codeword permuter 178. Codeword permuter 178 permutes the order of data within each of the plurality of codewords 507, based on one of the plurality of order data 176. In an embodiment of the present invention, order generator 174 operates in accordance with repeatable functions that can be duplicated by the authorized users, but that are unknown to unauthorized users.

Figure 11:
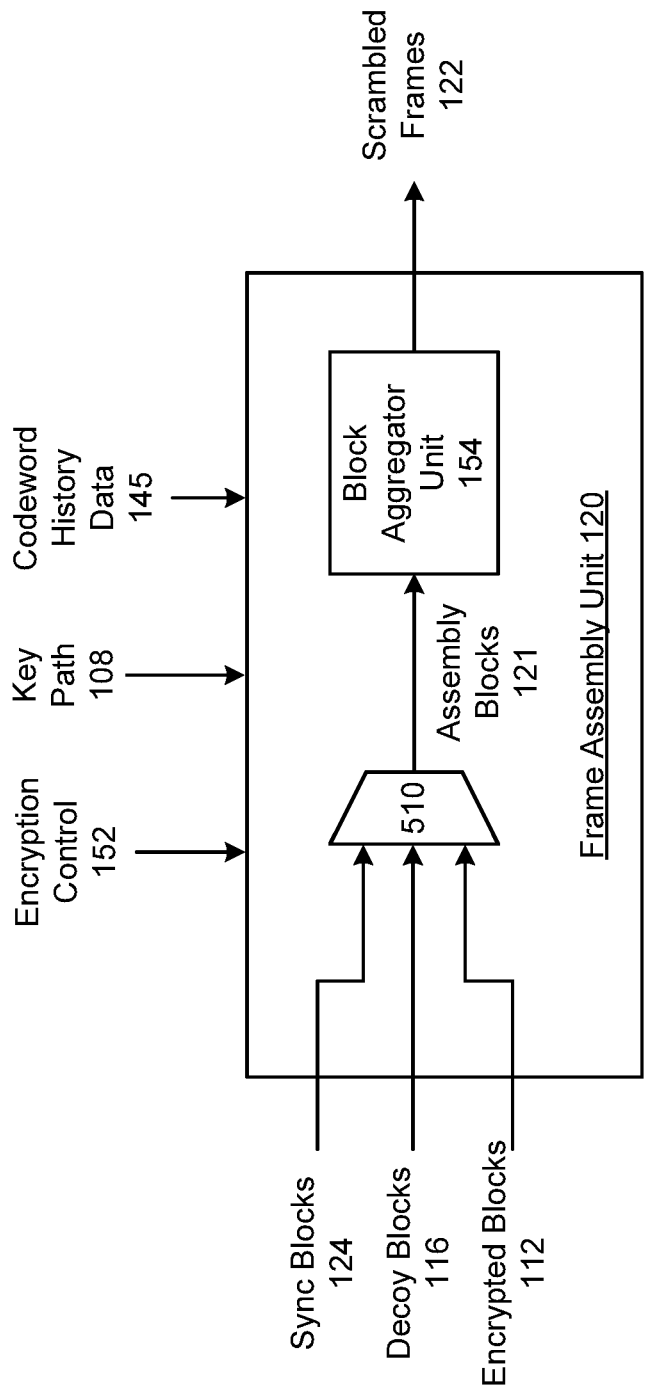
FIG. 11 is a schematic block diagram of an embodiment of a frame assembly unit 120 in accordance with the present invention.

FIG. 11 is a schematic block diagram of an embodiment of frame assembly unit 120 in accordance with the present invention. As shown, the frame assembly unit 120 includes block selector 510 and block aggregator 154. In this embodiment, block selector 510 selects each of the plurality of assembly blocks 121 as either one of the plurality of sync blocks 124 or one of the plurality of decoy blocks 116 or one of the plurality of encrypted blocks 112 based on the key path 108, the codeword history data 145 and encryption control 152. Block aggregator unit generates each of the plurality of scrambled frames 122 as an aggregation of a plurality of assembly blocks 121 as shown in FIG. 2 based on the key path 108, the codeword history data 145 and encryption control 152. The aggregation of the plurality of scrambled frames 122 forms the output ciphertext data 666. In an embodiment of the present invention, block selector 510, block aggregator unit 154 and frame assembly unit 120 operate in accordance with repeatable functions that can be duplicated by the authorized users, but that are unknown to unauthorized users.

Figure 12:
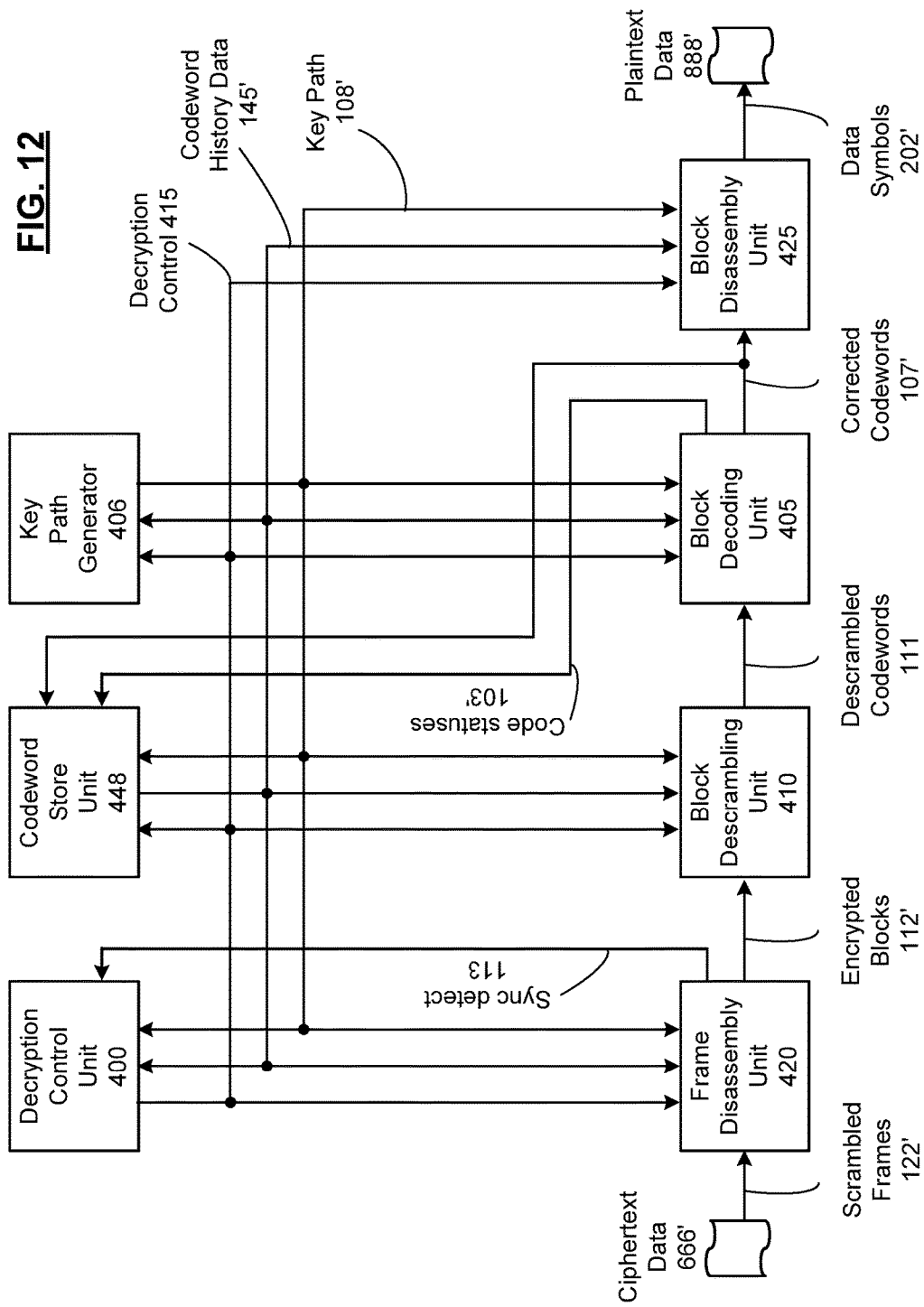
FIG. 12 is a schematic block diagram of an embodiment of a system in accordance with the present invention.

FIG. 12 is a schematic block diagram of an embodiment of a system in accordance with the present invention. In particular, a system is presented for descrambling a scrambled ciphertext data 666' that is a received, retrieved or otherwise recovered version of ciphertext data 666. Following this convention, reference numerals corresponding to data at various stages of the descrambling processing (xxx') correspond to a descrambled version of the corresponding signal with reference numeral (xxx) described in conjunction with the scrambling processing. Further many common elements from the scrambling system are used in a similar fashion in descrambling and will be referred to by common reference numerals. The system includes decryption control unit 400, frame disassembly unit 420, block descrambling unit 410, block decoding unit 405, block disassembly unit 425, another codeword store unit 448 and another key path generator 406 included in the descrambling system.

The decryption control unit 400, frame disassembly unit 420, block descrambling unit 410, block decoding unit 405, block disassembly unit 425, codeword store unit 448 and key path generator 406 can each be implemented via single processing device or a plurality of processing devices. Such a processing device may be a dedicated or shared microprocessor, micro-controller, digital signal processor, micro-computer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing device may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, a memory element can store, and the processing device can execute, hard coded and/or operational instructions corresponding to at least some of the steps and/or functions attributed to decryption control unit 400, frame disassembly unit 420, block descrambling unit 410, block decoding unit 405, block disassembly unit 425, codeword store unit 448 and key path generator 406.

Frame disassembly unit 420 is an optional pre-processing portion of the system shown in FIG. 12. In particular, frame disassembly unit 420 generates a plurality of encrypted blocks 112' from a ciphertext data 666', an aggregation of scrambled frames 122', based on the key path 108', the codeword history data 145' and decryption control 415. In operation, frame disassembly unit 420 recovers sync blocks 124' used for synchronizing the scrambled frames 122' and demarcates the encrypted blocks 112' and the decoy blocks 116' contained therein. The recovered sync blocks 124' and decoy blocks 116' of scrambled frame 122' are simply discarded. Different embodiments of the present invention may have different variations of frame disassembly unit 420 to "disassemble" a ciphertext data 666' corresponding to different embodiments of the scrambling system, shown in FIG. 1, that generated ciphertext data 666. For example, ciphertext data 666 could comprise the aggregation of only encrypted blocks or a combination of encrypted blocks and decoy blocks or a combination of encrypted blocks, decoy blocks and sync blocks or other variations. Common among all embodiments, frame disassembly unit 420 generates a plurality of encrypted blocks 112' from ciphertext data 666'. In an embodiment of the present invention, frame disassembly unit 420 operates in accordance with repeatable functions that can be duplicated by the authorized users, but that are unknown to unauthorized users.

Block descrambling unit 410 descrambles each of the plurality of encrypted blocks 112' to generate one of the plurality of descrambled codewords 111 based on key path 108', codeword history data 145' and the decryption control 415. In pertinent part, the block descrambling unit 410 reverses the key chaos, data chaos and permutation processing performed by block scrambling unit 110. In an embodiment of the present invention, block descrambling unit 410 operates in accordance with repeatable functions that can be duplicated by the authorized users, but that are unknown to unauthorized users.

Block decoding unit 405 generates each of the plurality of corrected codewords 107' by decoding one of the plurality of descrambled codewords 111 with the coding used by block coding unit 105 based on the key path 108', the codeword history data 145' and decryption control 415. For instance, block decoding unit 405 can process the descrambled codeword 111 based on the error correcting code employed in the scrambling system to correct for individual bit errors that were induced by entropy generator 140 during entropy processing or otherwise generated by transmission, retrieval or recovery. In an embodiment of the present invention, the selection of a linear block code, the size of the codeword and the codeword decoding threshold level operate in accordance with repeatable functions that can be duplicated by the authorized users, but that are unknown to unauthorized users.

Block disassembly unit 425 disassembles each of the plurality of corrected codewords 107' into a plurality of data symbols 202' and a plurality of random symbols 200' and a plurality of parity symbols 203 based on the key path 108', the codeword history data 145' and decryption control 415. The aggregation of the plurality of data symbols 202' forms plaintext data 888'. The plurality of random symbols 200' and the plurality of parity symbols 203 can simply be discarded or otherwise unused. In an embodiment of the present invention, block disassembly unit 425 operates in accordance with repeatable functions that can be duplicated by the authorized users, but that are unknown to unauthorized users.

Codeword store unit 448 shown in FIG. 12 operates in a similar fashion to codeword store unit 148 in the system shown in FIG. 1. Codeword store unit 448 generates codeword history data 145' based on the plurality of past decrypted and corrected codewords 107' and code statuses 103'. For example, the codeword store unit 448 may include a finite impulse response filter, an infinite impulse response filter, an exponentially weighted moving average or other function that includes a "memory" of one or more past values of the corrected codewords 107' and code statuses 103'. In this fashion, the codeword history data 145' is a function of one or more of these past values. In an embodiment of the present invention, codeword store unit 448 operates in accordance with repeatable functions that can be duplicated by the authorized users, but that are unknown to unauthorized users.

Keypath generator 406 shown in FIG. 12 operates in a similar fashion to keypath generator 106 in the system shown in FIG. 1. Keypath generator 406 generates a key path 108' that includes information derived from each of the k keys 132. In an embodiment of the present invention, keypath generator 406 operates in accordance with repeatable functions that can be duplicated by the authorized users, but that are unknown to unauthorized users.

Decryption control unit 400 controls and sequences the operation of the system, as shown for example in FIG. 12, in processing input ciphertext data 666' to generate output plaintext data 888'. Within decryption control unit 400, one or more controllers, implemented as state machines, automata structures or other control devices, generate decryption control 415 based on the current states of the controllers, the sync detect 113, the key path 108' and the codeword history data 145'. The control functions of decryption control unit 400 can be centralized, as shown in FIG. 12, distributed among the other units and generators in the system or some combination thereof. Based on the distribution of control, the granularity of decryption control 415 can be abstract, e.g., the number of encrypted blocks per scrambled frames, detailed, e.g., the symbol size of a codeword or control of a data selector, or some combination thereof. In an embodiment of the present invention, decryption control unit 400 operates in accordance with repeatable functions that can be duplicated by the authorized users, but that are unknown to unauthorized users.

Figure 13:
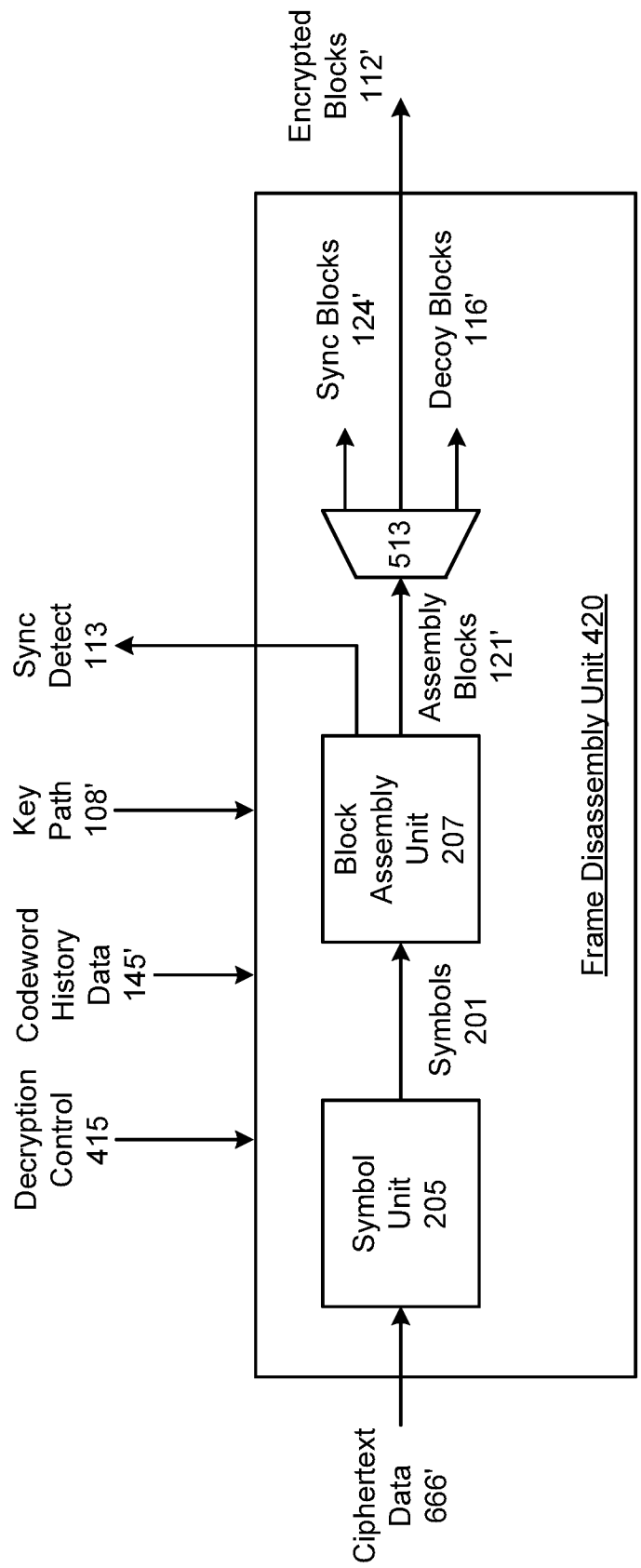
FIG. 13 is a schematic block diagram of an embodiment of a frame disassembly unit 420 in accordance with the present invention.

FIG. 13 is a schematic block diagram of an embodiment of frame disassembly unit 420 in accordance with the present invention. In particular, an optional pre-processing portion is presented to be used in conjunction with a system that includes symbol unit 205, block assembly unit 207 and block demultiplexer 513. As discussed in conjunction with FIG. 12, the optional frame disassembly unit 420 recovers sync blocks 124' used for synchronizing the scrambled frames 122' and demarcates the encrypted blocks 112' and the decoy blocks 116' contained therein. The recovered sync blocks 124' and decoy blocks 116' of scrambled frame 122' are simply discarded. In an embodiment of the present invention, frame disassembly unit 420 operates in accordance with repeatable functions that can be duplicated by the authorized users, but that are unknown to unauthorized users.

Symbol unit 205 converts ciphertext data 666' into a plurality of symbols 201 based on the key path 108', the codeword history data 145' and decryption control 415. Block assembly unit 207 generates each of the plurality of assembly blocks 121' from aggregating a plurality of symbols 201 based on the key path 108', the codeword history data 145' and decryption control 415. Block assembly unit 207 also generates each of the plurality of sync detect signals 113 indicating the presence or lack of presence of a sync block 124' within one of the plurality of assembly blocks 121'. In recovery mode, block assembly unit 207 realigns each of the plurality of assembly blocks 121' upon detecting a sync block 124'. Block demultiplexer 513, implemented via a demultiplexer as shown or other control circuit, separates each of the plurality of assembly blocks 121' as either one of the plurality of sync blocks 124' or one of the plurality of decoy blocks 116' or one of the plurality of encrypted blocks 112' based on the key path 108', the codeword history data 145' and decryption control 415. In an embodiment of the present invention, symbol unit 205, block assembly unit 207 and block demultiplexer 513 operate in accordance with repeatable functions that can be duplicated by the authorized users, but that are unknown to unauthorized users.

Figure 14:
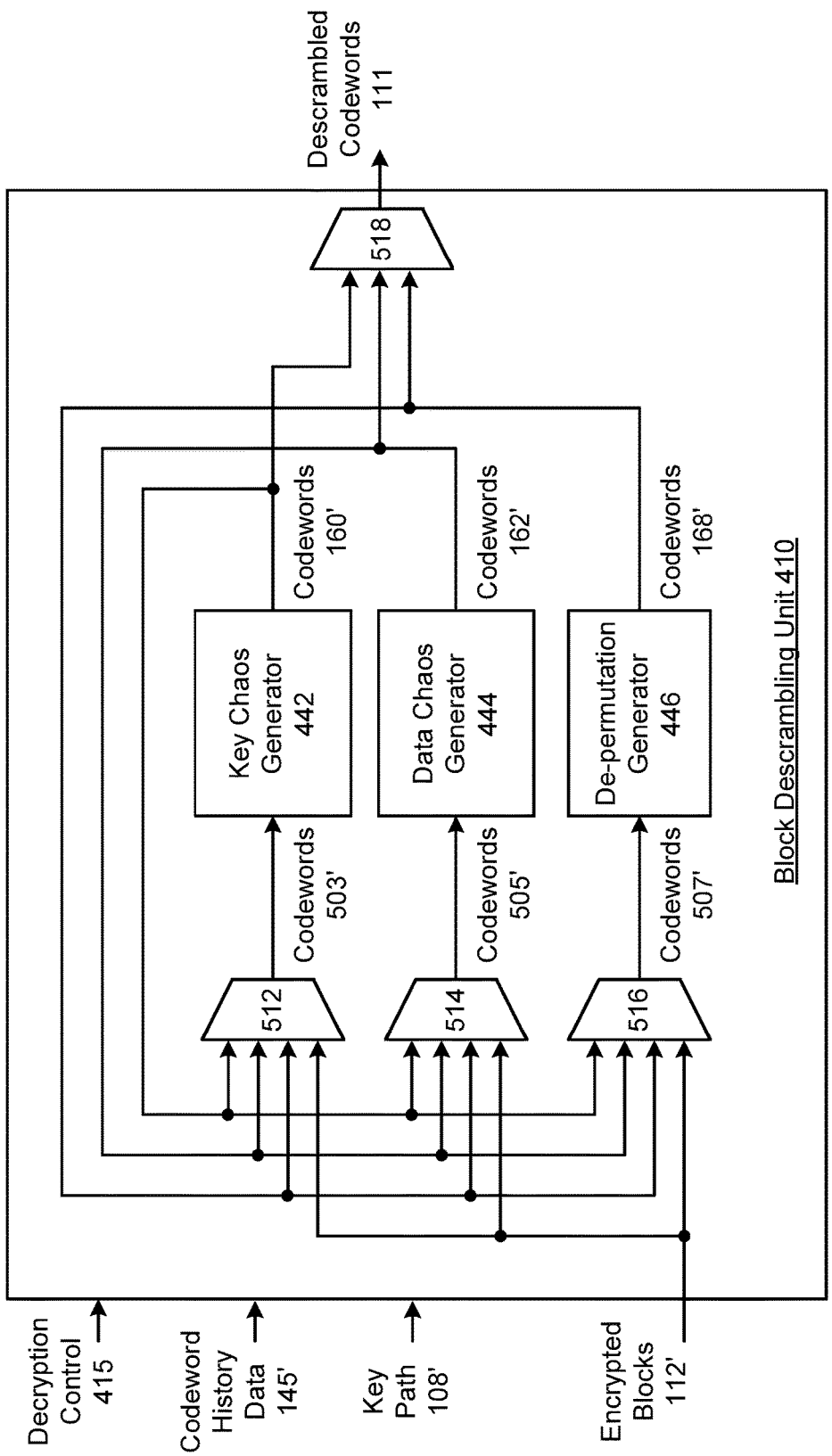
FIG. 14 is a schematic block diagram of an embodiment of a block descrambling unit 410 in accordance with the present invention.

FIG. 14 is a schematic block diagram of an embodiment of block descrambling unit 410 in accordance with the present invention. As shown, the block descrambling unit 410 includes codeword selector 512, key chaos generator 442, codeword selector 514, data chaos generator 444, codeword selector 516, de-permutation generator 446 and codeword selector 518. As discussed in conjunction with FIG. 12, the block descrambling unit 410 reverses the key chaos, data chaos and permutation processing performed by block scrambling unit 110 based on the key path 108', the codeword history data 145' and decryption control 415. For proper descrambling, block descrambling unit 410 processes each of the plurality of encrypted blocks 112' in the reverse sequence of key chaos processing, data chaos processing and permutation processing performed by block scrambling unit 110 on one of the plurality of codewords 107. Block decoding unit 405 reverses the entropy processing effects performed by block scrambling unit 110 on codeword 107 based on the key path 108', the codeword history data 145' and decryption control 415. In an embodiment of the present invention, block descrambling unit 410 operates in accordance with repeatable functions that can be duplicated by the authorized users, but that are unknown to unauthorized users.

Codeword selector 516, implemented via a multiplexer as shown or other control circuit, selects each of the plurality of codewords 507' to be processed by the de-permutation generator 446 as either one of the plurality of encrypted blocks 112' or one of the plurality of key chaos decoded codewords 160' or one of the plurality of data chaos decoded codewords 162' or one of the plurality of de-permutated codewords 168' based on the key path 108', the codeword history data 145' and decryption control 415. De-permutation generator 446 permutes each of the plurality of codewords 507' to generate one of the plurality of de-permutated codewords 168' based on the key path 108', the codeword history data 145' and decryption control 415. In an embodiment of the present invention, codeword selector 516 operates in accordance with repeatable functions that can be duplicated by the authorized users, but that are unknown to unauthorized users.

Codeword selector 514, implemented via a multiplexer as shown or other control circuit, selects each of the plurality of codewords 505' to be processed by the data chaos generator 444 as either one of the plurality of encrypted blocks 112' or one of the plurality of key chaos decoded codewords 160' or one of the plurality of data chaos decoded codewords 162' or one of the plurality of de-permutated codewords 168' based on the key path 108', the codeword history data 145' and decryption control 415. Data chaos generator 444 data chaos processes each of the plurality of codewords 505' to generate one of the plurality of data chaos decoded codewords 162' based on the key path 108', the codeword history data 145' and decryption control 415. In an embodiment of the present invention, codeword selector 514 operates in accordance with repeatable functions that can be duplicated by the authorized users, but that are unknown to unauthorized users.

Codeword selector 512, implemented via a multiplexer as shown or other control circuit, selects each of the plurality of codewords 503' to be processed by the key chaos generator 442 as either one of the plurality of encrypted blocks 112' or one of the plurality of key chaos decoded codewords 160' or one of the plurality of data chaos decoded codewords 162' or one of the plurality of de-permutated codewords 168' based on the key path 108', the codeword history data 145' and decryption control 415. The key chaos generator 442 key chaos processes each of the plurality of codewords 503' to generate one of the plurality of decrypted codewords 160' based on the key path 108', the codeword history data 145' and decryption control 415. In an embodiment of the present invention, codeword selector 512 operates in accordance with repeatable functions that can be duplicated by the authorized users, but that are unknown to unauthorized users.

Codeword selector 518, implemented via a multiplexer as shown or other control circuit, selects each of the plurality of descrambled codewords 111 as either one of the plurality of key chaos decoded codewords 160' or one of the plurality of data chaos decoded codewords 162' or one of the plurality of de-permutated codewords 168' based on the key path 108', the codeword history data 145' and decryption control 415. In an embodiment of the present invention, codeword selector 518 operates in accordance with repeatable functions that can be duplicated by the authorized users, but that are unknown to unauthorized users.

Figure 15:
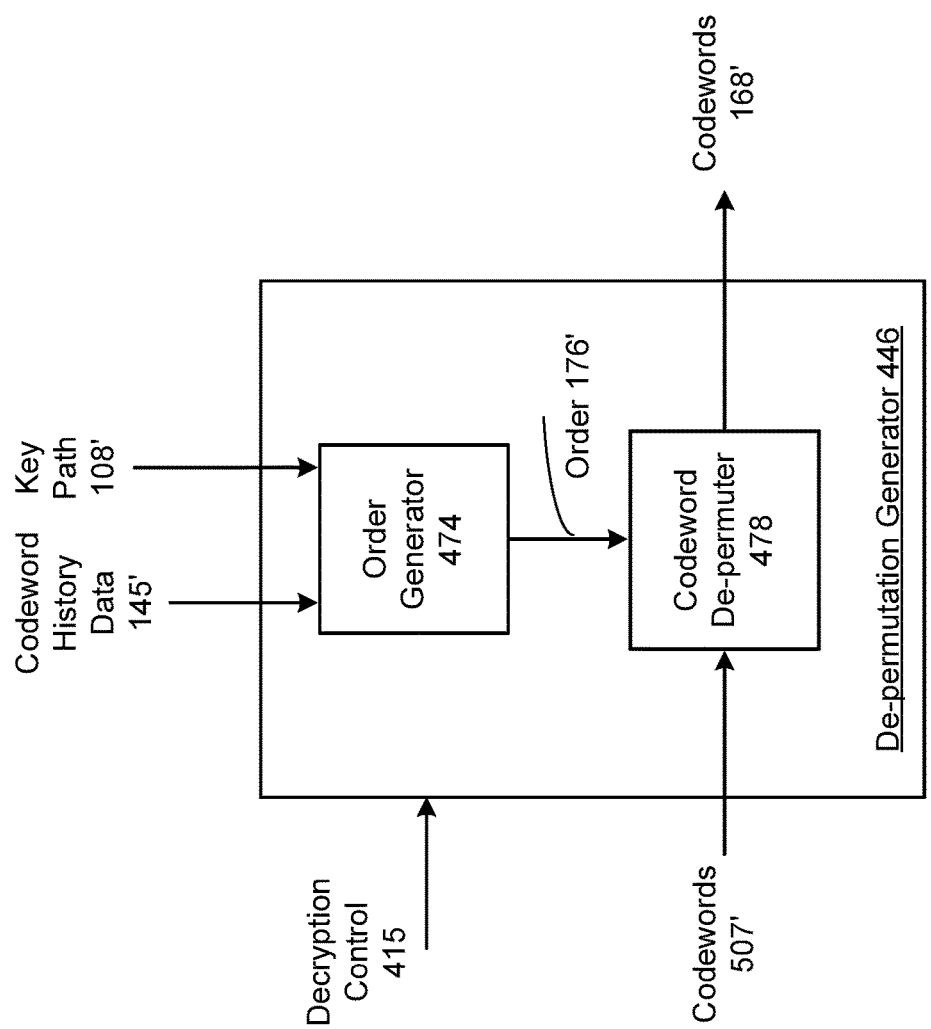
FIG. 15 is a schematic block diagram of an embodiment of a de-permutation generator 446 in accordance with the present invention.

FIG. 15 is a schematic block diagram of an embodiment of de-permutation generator 446 in accordance with the present invention. In particular, the de-permutation generator 446 includes an order generator 474 that generates each of the plurality of permutation orders 176' based on the key path 108', the codeword history data 145' and the decryption control 415. In this fashion, when processing a particular codeword 507', a particular set of order data 176' is generated that corresponds to the order used to permute that particular codeword 507'. Codeword de-permuter 478 permutes the order of data within each of the plurality of codewords 507' to reverse the permutation performed by permutation generator 146 to form one of the plurality of de-permutated codewords 168'. In an embodiment of the present invention, de-permutation generator 446 operates in accordance with repeatable functions that can be duplicated by the authorized users, but that are unknown to unauthorized users.

Figure 16:
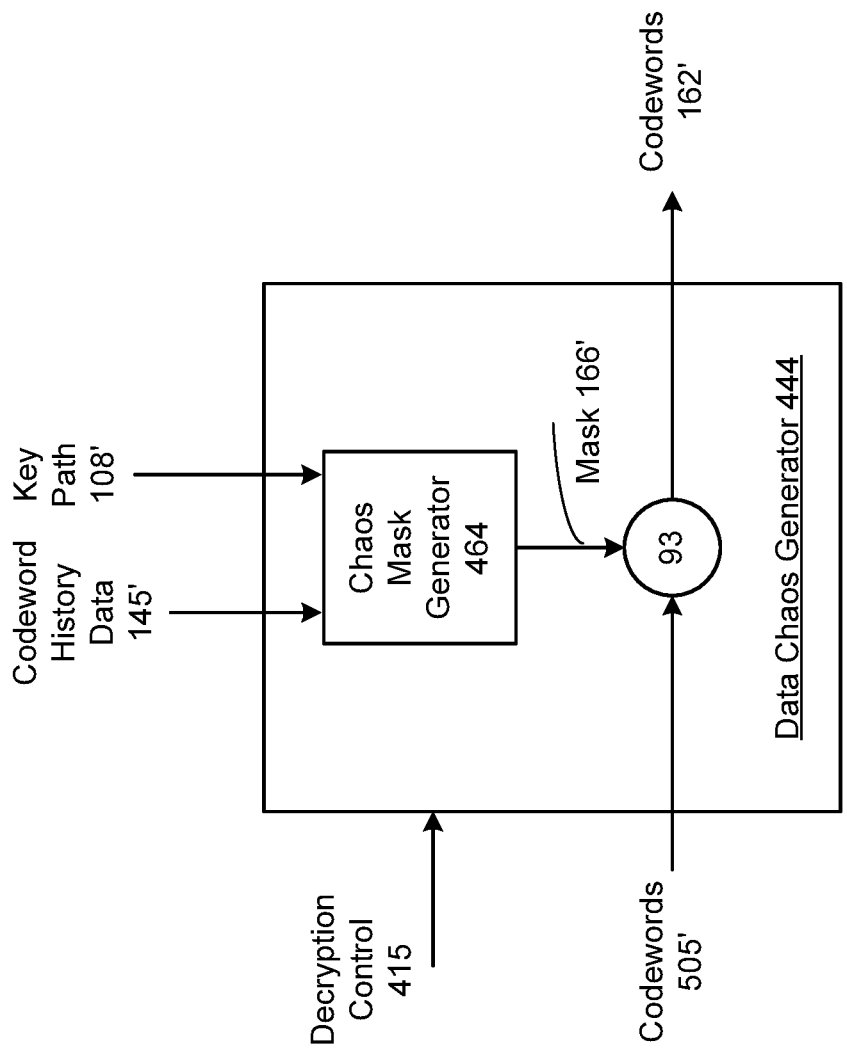
FIG. 16 is a schematic block diagram of an embodiment of a data chaos generator 444 in accordance with the present invention.

FIG. 16 is a schematic block diagram of an embodiment of data chaos generator 444 in accordance with the present invention. In particular, data chaos generator 444 includes a chaos mask generator 464 that generates each of the plurality of mask data 166' based on the key path 108', the codeword history 145' and the decryption control 415. In an embodiment of the present invention, the data chaos generator 444 generates each of the plurality of data chaos decoded codewords 162' by de-corrupting one of the plurality of codewords 505' based on one of the plurality of mask data 166'—reversing the data chaos processing performed by chaos processor 144. For instance, the mask data 166' indicates the position of each of plurality of bit errors that were inserted in the codeword 505' during scrambling. Toggling these bit positions via combiner 93 serves to reverse these errors. Combiner 93 operates in a similar fashion to combiner 90 shown in FIG. 7 based on the key path 108', the codeword history data 145' and decryption control 415. In an embodiment of the present invention, data chaos generator 444 operates in accordance with repeatable functions that can be duplicated by the authorized users, but that are unknown to unauthorized users.

Figure 17:
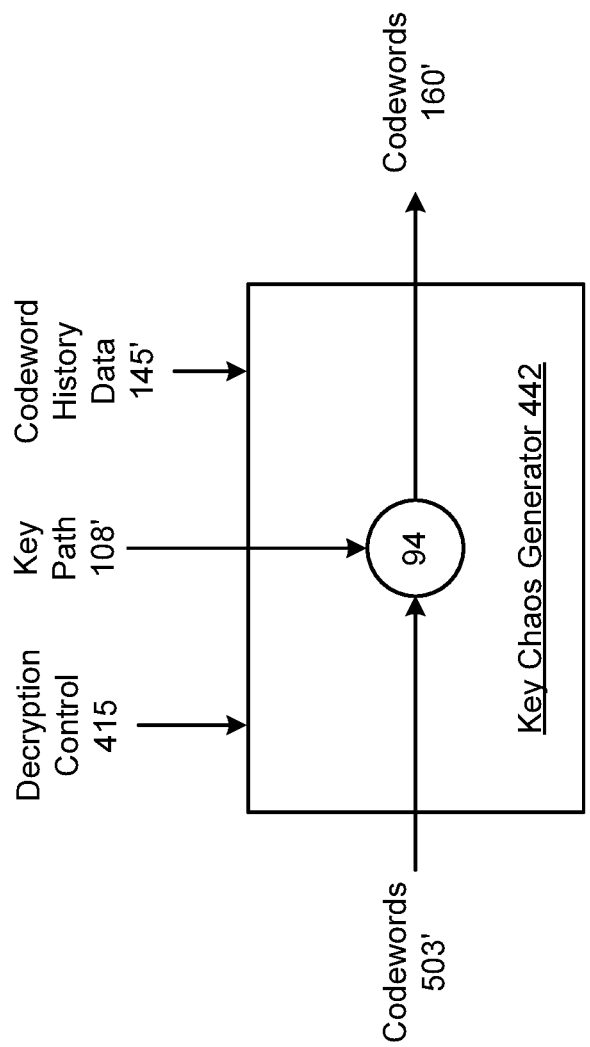
FIG. 17 is a schematic block diagram of an embodiment of a key chaos generator 442 in accordance with the present invention.

FIG. 17 is a schematic block diagram of an embodiment of key chaos generator 442 in accordance with the present invention. In this embodiment, the key chaos generator 442 forms each of the plurality of key chaos decoded codewords 160' by simply decrypting one of the plurality of codewords 503' via keypath 108' based on the key path 108', the codeword history data 145' and decryption control 415. In particular, key chaos generator 442 combines, via combiner 94, each bit of the key path 108' with a bit of each codeword 503'. Toggling these bits via combiner 94 serves to remove the effects of key path 108 from codeword 503'. Combiner 94 operates in a similar fashion to combiner 90 shown in FIG. 7 based on the key path 108', the codeword history data 145' and decryption control 415. In other embodiments of the present invention, other decryption methodologies could be used at this step including AES (advanced encryption standard), DES (data encryption standard), 3DES, etc., depending on the encryption method employed in the scrambling process. In an embodiment of the present invention, key chaos generator 442 operates in accordance with repeatable functions that can be duplicated by the authorized users, but that are unknown to unauthorized users.

Figure 18:
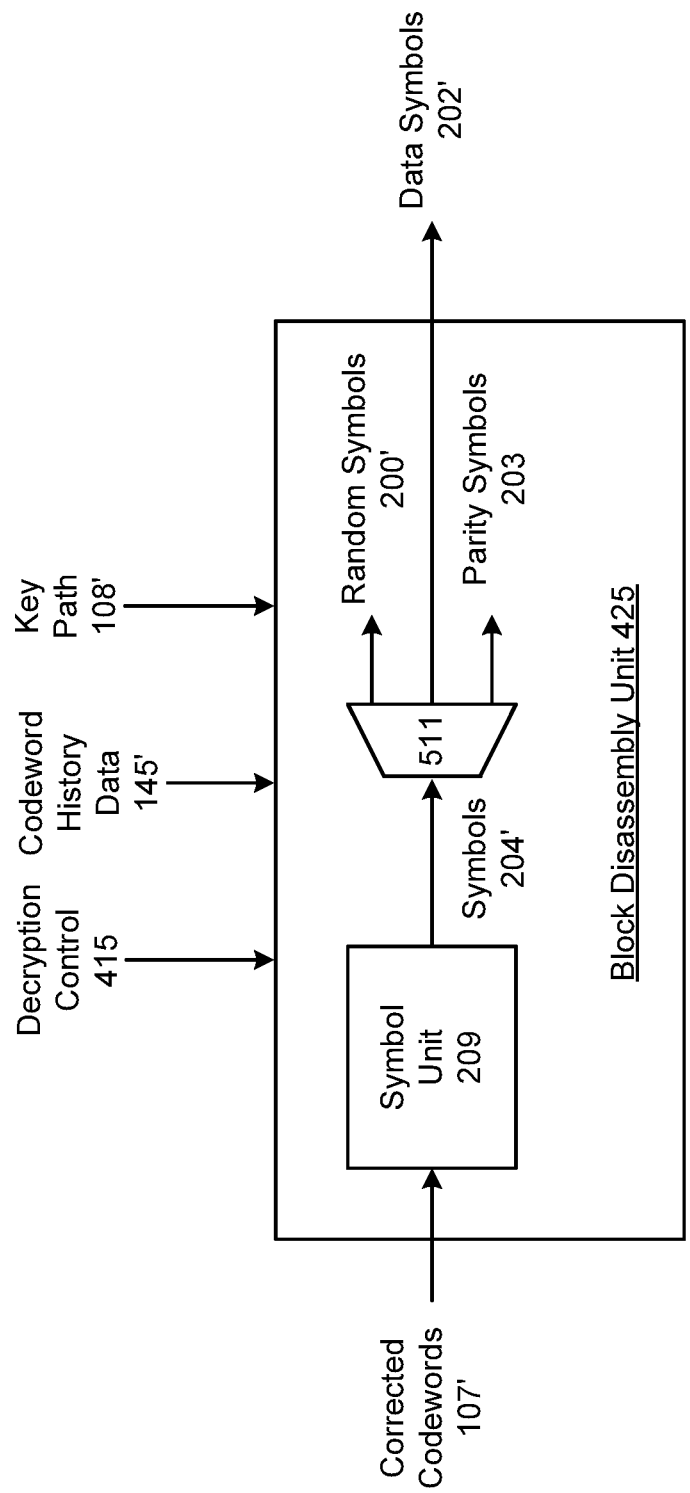
FIG. 18 is a schematic block diagram of an embodiment of a block disassembly unit 425 in accordance with the present invention.

FIG. 18 is a schematic block diagram of an embodiment of block disassembly unit 425 in accordance with the present invention. As shown, block disassembly unit 425 includes symbol unit 209 and symbol demultiplexer 511. In particular, an optional post-processing portion is presented to be used in conjunction with a system that includes an enhanced symbol demultiplexer 511. Symbol unit 209 converts each of the plurality of corrected codewords 107' into a plurality of symbols 204' based on the key path 108', the codeword history data 145' and decryption control 415. Symbol demultiplexer 511, implemented via a demultiplexer as shown or other control circuit, separates each of the plurality of symbols 204' as either one of the plurality of data symbols 202' or one of the plurality of parity symbols 203 based on the key path 108', the codeword history data 145' and decryption control 415. In an optional post-processing portion, the symbol demultiplexer 511 shown in FIG. 18 includes the separation of a plurality of random symbols 200' based on the key path 108', the codeword history data 145' and decryption control 415. As discussed in conjunction with FIG. 12, the plurality of random symbols 200' and the plurality of parity symbols 203 can simply be discarded or otherwise unused. In an embodiment of the present invention, symbol unit 209 and symbol demultiplexer 511 operate in accordance with repeatable functions that can be duplicated by the authorized users, but that are unknown to unauthorized users.

The use of the codeword history data 145' and key path 108' in the key chaos, data chaos and de-permutation processing further confound the efforts of an unauthorized user attempting to isolate and descramble the data symbols 202' from the encrypted blocks 112'. In particular, knowledge of each of the k keys 132 and the ultimate key path 108' and proper processing of prior codewords will be required for descrambling.

While the description above is based on a particular order for the operations of entropy processing, key chaos processing, data chaos processing and de-permutation, it should be noted that these operations could be presented in different dynamic orders—as long as the order used in descrambling is reversed from the order used in the scrambling operations used to generate scrambled frame 122'.

Figure 19:
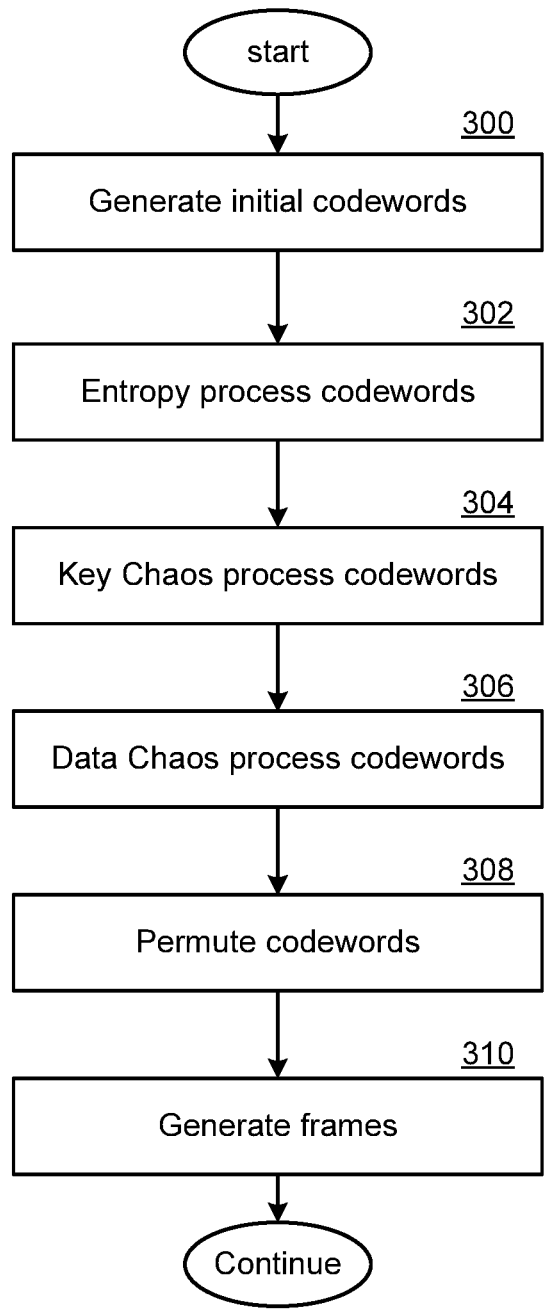
FIG. 19 is a flow diagram of an embodiment of a method in accordance with the present invention.
Figure 20:
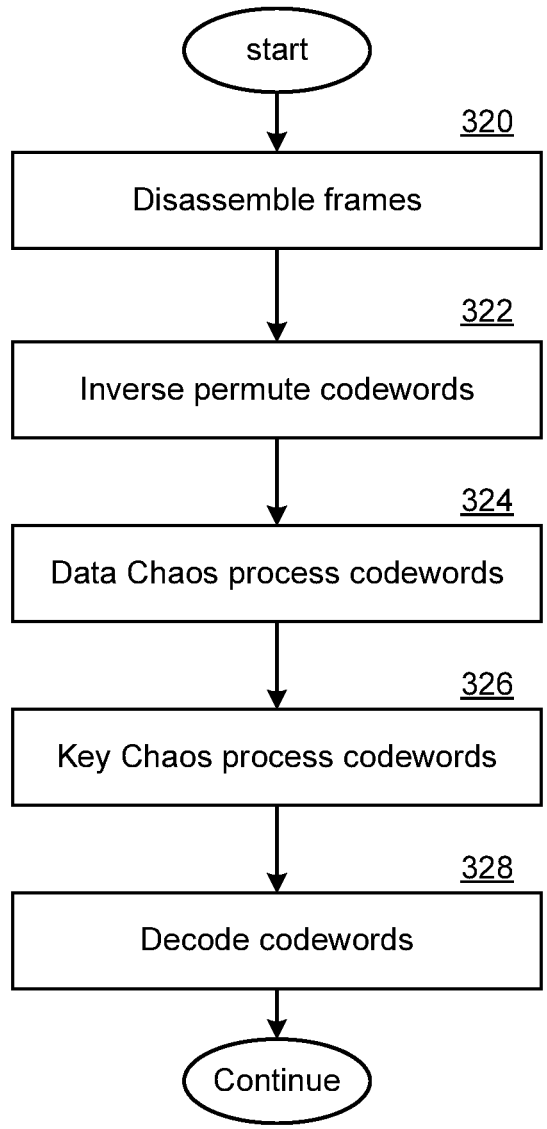
FIG. 20 is a flow diagram of an embodiment of a method in accordance with the present invention.

FIGS. 19 and 20 are flow diagrams of embodiments of methods in accordance with the present invention. In particular, methods are shown that can be used in conjunction with one or more functions and features described in conjunction with FIGS. 1-18. In step 300 initial codewords are generated from data to be protected. In steps 302, 304, 306 and 308, the codewords are entropy, key chaos, data chaos and permutation processed to produce encrypted blocks that can be used in step 310 to generate scrambled frames. In step 320, the scrambled frames are disassembled. In steps 322, 324 and 326, the codewords are de-permutation, data chaos and key chaos processed to reverse the processing performed in steps 304, 306 and 308. In step 328, the codewords are decoded to reverse entropy processing performed in step 302 and recover the original data. The flow diagrams shown in FIGS. 19-20 indicate a specific sequence of processing and un-processing steps. In an embodiment of the present invention, the processing and un-processing steps of the codewords operate in accordance with repeatable functions that can be duplicated by the authorized users, but that are unknown to unauthorized users.

The operation of the methods of FIGS. 19 and 20 can be described in conjunction with the following example that includes many optional functions and features. This example describes the system and methods of encrypting a plaintext data set PDS into an ciphertext data set CDS and decrypting an ciphertext data set CDS into a plaintext data set PDS.

Let plaintext data set PDS be decomposed into a sequence of n data segments, $ds_1 \ldots ds_n$.

Let ciphertext data set CDS be composed of a sequence of m frames, $f_1 \ldots f_m$.

Let frame f be composed of a sequence of p blocks, $b_1 \ldots b_p$.

There are 5 types of blocks:
SYNC block: contains a sync header and marker.
DATA block: contains a data segment ds.
RANDOM block: contains a random segment rs of random values generated by an appropriate random generator, e.g., pseudo-random or crypto-random.
HYBRID block: contains a data segment ds intertwined with a random segment rs.
DECOY block: contains a variable number of random values.

A SYNC block marks the beginning of a frame f and provides an encryption/decryption reset boundary for purposes of data recovery.

A DATA block is the resulting error correction codeword for data segment ds after being exposed to entropy and chaos.

A RANDOM block is the resulting error correction codeword for random segment rs after being exposed to entropy and chaos.

A HYBRID block is the resulting error correction codeword for intertwined data segment ds and random segment rs after being exposed to entropy and chaos.

A DECOY block contains a variable number of random values.

Let the q keys of different lengths be represented as $key_1 \ldots key_q$.

Let key stream $ks_i$ be defined as a perpetual repeating sequence of $key_i$, i.e., key stream $ks_i = key_i, key_i, key_i, \ldots$.

Let a key river kr be defined as the parallel bundling of q key streams of the respective q keys of different lengths. The key river kr has a width of q bits and a perpetual length.

Let a binary function rc be defined as a function of q inputs.

Let a key path kp be defined as the sequence resulting from the application of binary function rc across the key river kr as kr is traversed in perpetuity. The key path kp has a width of 1 bit and a perpetual length.

In accordance with this example, the data and random segments are encrypted into data, random and hybrid blocks in the following manner:

a) Let the working block initially be the error correction codeword $cw_i$ for data segment ds and/or random segment rs constructed using an error correction methodology to recover from $(e_i + g_i)$ symbol errors. Let status $s_i$ be defined as the status of codeword $cw_i$.

b) Perform entropy processing by randomly injecting up to $e_i$ random symbol errors into the working block.

c) Traverse the key path kp by the length of the working block. Perform key chaos processing by injecting the traversed portion of the key path as bit toggle errors into the working block.

d) Generate a chaotic mask as a function of codewords $cw_{i-1} \ldots cw_0$, statuses $s_{i-1} \ldots s_0$ and kep path kp. Perform data chaos processing by injecting the chaotic mask as bit toggle errors into the working block.

e) Permute the working block as a function of codewords $cw_{i-1} \ldots cw_0$, statuses $s_{i-1} \ldots s_0$ and key path kp. The resulting working block represents the encrypted block for data segment ds and/or random segment rs.

In accordance with this example, data and random segments are decrypted from data, random and hybrid blocks in the following manner:

a) Let the working block initially be encrypted block $b_i$.

b) Perform an inverse permute of the working block as a function of codewords $cs_{i-1} \ldots cw_0$, statuses $s_{i-1} \ldots s_0$ and key path kp.

c) Perform data chaos de-processing by generating a chaotic mask as a function of codewords $cw_{i-1} \ldots cw_0$, statuses $s_{i-1} \ldots s_0$ and key path kp and bit toggle against the working block to remove the previous chaotic mask.

d) Perform key chaos de-processing by traversing the key path kp by the length of the working block and bit toggle the traversed portion of the key path as bit corrections into the working block.

e) Apply the error correction methodology on the working block to correct the previously injected up to $e_i$ random symbol errors from the entropy process. Up to an additional $g_i$ symbol errors can also be corrected due to errors from the transmission/storage medium (aka "acts of god").

f) The resulting working block represents the corrected error correction codeword Let status $s_i$ be defined as the status of the corrected error correction codeword Data segment ds and/or random segment rs are retrieved from codeword $cw_i$.

The following functions are used in the encryption and decryption process:

block_type(kp, $cw_{i-1} \ldots cw_0, s_{i-1} \ldots s_0$): deterministically specifies the type of block $b_j$ to be generated or processed.

cw_blend(kp, $cw_{i-1} \ldots cw_0, s_{i-1} \ldots s_0$): deterministically specifies the intertwining manner of data segment ds and random segment rs within codeword $cw_i$.

cw_code(kp, $cw_{i-1} \ldots cw_0, s_{i-1} \ldots s_0$): deterministically specifies the error correction methodology used to encode codeword $cw_i$.

cw_size(kp, $cw_{i-1}$ ... $cw_0$, $s_{i-1}$ ... $s_0$): deterministically specifies the size of codeword $cw_i$ in block $b_j$.

cw_e(kp, $cw_{i-1}$ ... $cw_0$, $s_{i-1}$ ... $s_0$): deterministically specifies the maximum number of injected symbol errors in codeword $cw_i$ in block $b_j$.

cw_g(kp, $cw_{i-1}$ ... $cw_0$, $s_{i-1}$ ... $s_0$): deterministically specifies the number of recoverable symbol errors due to the transmission/storage medium (aka "acts of god") in codeword $cw_i$ in block $b_j$.

entropy(kp, $cw_{i-1}$ ... $cw_0$, $s_{i-1}$ ... $s_0$): non-deterministically generates a bit toggling block mask for codeword $cw_i$ in block $b_j$.

key_chaos(kp, $cw_{i-1}$ ... $cw_0$, $s_{i-1}$ ... $s_0$): deterministically generates a bit toggling block mask for codeword $cw_i$ in block $b_j$.

data_chaos(kp, $cw_{i-1}$ ... $cw_0$, $s_{i-1}$ ... $s_0$): deterministically generates a bit toggling block mask for codeword $cw_i$ in block $b_j$.

permute(kp, $cw_{i-1}$ ... $cw_0$, $s_{i-1}$ ... $s_0$): deterministically generates a block permutation for codeword $cw_i$ in block $b_j$.

ipermute(kp, $cw_{i-1}$ ... $cw_0$, $s_{i-1}$ ... $s_0$): deterministically generates an inverse block permutation for codeword $cw_i$ in block $b_j$.

encrypt_order(kp, $cw_{i-1}$ ... $cw_0$, $s_{i-1}$ ... $s_0$): deterministically specifies the sequence order of entropy, key chaos, data chaos and permutation processing on codeword $cw_i$ to form block $b_j$.

decrypt_order(kp, $cw_{i-1}$ ... $cw_0$, $s_{i-1}$ ... $s_0$): deterministically specifies the sequence order of key chaos, data chaos and inverse permutation processing on block $b_j$ to form a correctable codeword $cw_i$.

As functions of key path kp, codewords $cw_{i-1}$ ... $cw_0$, and statuses $s_{i-1}$ ... and $s_0$, functions permute and ipermute are complementary functions on block b, i.e., block b=ipermute(permute(block b))=permute(ipermute(block b))

Let codeword $cw_0$ be a function of the keys $key_1$ ... $k_q$.
Let status $s_0$ be the status of codeword $cw_0$.

A plaintext data set PDS is encrypted into an ciphertext data set CDS in the following manner:
a) Let i=1, j=1, and k=1.
b) Repeat the following steps until all n data segments ds have been encrypted from plaintext data set PDS:
1. Function block_type( ) specifies the type of block $b_j$ to be generated: SYNC, DATA, RANDOM, HYBRID or DECOY.
2. For a SYNC block:
    Generate an appropriate sync header and marker data for SYNC block $b_j$.
    Increment j.
3. For a DECOY block:
    Using functions cw_code( ) and cw_size( ), create an appropriately sized block of random values for DECOY block $b_j$.
    Increment j.
4. For a DATA block:
    Using functions cw_code( ) and cw_size( ), read and create an appropriately sized data segment $ds_k$ from plaintext data set PDS.
    Using functions encrypt_order( ), cw_code( ), cw_size( ), cw_e( ), cw_g( ), entropy( ), key_chaos( ), data_chaos( ), and permute ( ), generate DATA block $b_j$ for data segment $ds_k$.
    Increment i, j, and k.
5. For a RANDOM block:
    Using functions cw_code( ) and cw_size( ), create an appropriately sized random segment $rs_j$.
    Using functions encrypt_order( ), cw_code( ), cw_size( ), cw_e( ), cw_g( ), entropy( ), key_chaos( ), data_chaos( ), and permute( ), generate RANDOM block $b_j$ for random segment $rs_j$.
    Increment i and j.
6. For a HYBRID block:
    Using functions cw_code( ), cw_size( ) and cw_blend( ), create and intertwine an appropriately sized data segment $ds_k$ from plaintext data set PDS with an appropriately sized random segment $rs_j$.
    Using functions encrypt_order( ), cw_code( ), cw_size( ), cw_e( ), cw_g( ), entropy( ), key_chaos( ), data_chaos( ), and permute( ), generate HYBRID block $b_j$ for data segment $ds_k$ and random segment $rs_j$.
    Increment i, j, and k.

At the end of this process,
(i−1) is the number of codewords cw representing data and random blocks/segments.
(j−1) is the number of blocks b in ciphertext data set CDS.
(k−1) is the number of data segments ds in plaintext data set PDS.

The generated blocks $b_1$ ... $b_{j-1}$ form frames $f_1$ ... $f_m$ to form ciphertext data set CDS.

A ciphertext data set CDS is decrypted into a plaintext data set PDS in the following manner:
a) Let i=1, j=1, and k=1.
b) Repeat the following steps until all blocks b have been processed from ciphertext data set CDS:
1) Function block_type( ) specifies the type of block $b_j$ to be processed from ciphertext data set CDS: SYNC, DATA, RANDOM, HYBRID or DECOY.
2) For a SYNC block:
    Read and create a SYNC block $b_j$ of appropriate size from ciphertext data set CDS corresponding to the sync header and marker data.
    Increment j.
3) For a DECOY block:
    Using functions cw_code( ) and cw_size( ), read and create a DECOY block $b_j$ of appropriate size from ciphertext data set CDS.
    Increment j.
4) For a DATA block:
    Using functions cw_code( ) and cw_size( ), read and create a DATA block $b_j$ of appropriate size from ciphertext data set CDS.
    Using functions decrypt_order( ), cw_code( ), cw_size( ), cw_e( ), cw_g( ), key_chaos( ), data_chaos( ), and ipermute( ), decrypt DATA block $b_j$ to obtain codeword $cw_i$.
    Retrieve data segment $ds_k$ from codeword $cw_i$.
    Increment i, j, and k.
5) For a RANDOM block:
    Using functions cw_code( ) and cw_size( ), read and create a RANDOM block $b_j$ of appropriate size from ciphertext data set CDS.
    Using functions decrypt_order( ), cw_code( ), cw_size( ), cw_( ), cw_g( ), key_chaos( ), data_chaos( ), and ipermute( ), decrypt RANDOM block $b_j$ to obtain codeword $cw_i$.
    Increment i and j.
6) For a HYBRID block:
    Using functions cw_code( ) and cw_size( ), read and create a HYBRID block $b_j$ of appropriate size from ciphertext data set CDS.

Using functions decrypt_order( ), cw_code( ), cw_( ), cw_e( ), cw_g( ), key_chaos( ), data_chaos( ), and ipermute( ), decrypt HYBRID block $b_j$ to obtain codeword $cw_i$.

Using functions cw_code( ), cw_size( ), and cw_blend ( ), retrieve data segment $ds_k$ from codeword $cw_i$.

Increment i, j, and k.

At the end of this process, (i−1) is the number of codewords cw representing data and random blocks/segments.

(j−1) is the number of blocks b in ciphertext data set CDS.

(k−1) is the number of data segments ds in plaintext data set PDS.

The extracted data segments $ds_1 \ldots ds_{k-1}$ form plaintext data set PDS.

As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and/or indirect coupling between two items in the same manner as "coupled to". As may even further be used herein, the term "operable to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

Elements of the present invention can be performed via a processing device that executes a series of operational instructions that can be stored on a tangible storage medium and produced as an article of manufacture.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A system comprising:
  processing circuitry that includes:
    key store hardware that stores a plurality of encryption keys;
    key stream generator hardware, coupled to the key store hardware, that generates a plurality of key streams from the plurality of encryption keys, wherein each key stream comprises a repeating stream of key data;
    key river generator hardware, coupled to the key stream generator hardware, that generates a key river by parallelizing the plurality of key streams as key river symbols, wherein bits from each key river symbol are selected from each key stream as individual bits from differing ones of the plurality of encryption keys; and
    binary processor hardware, coupled to the key river generator hardware, that generates a key path as a sequence of binary digits generated from at least one binary function of the key river.

2. The system of claim 1 wherein the key stream generator hardware includes a plurality of pseudo-random number generators each coupled to receive a corresponding one of the plurality of encryption keys and wherein components of the plurality of encryption keys each specify an initial seed value of one of the plurality of pseudo-random number generators.

3. The system of claim 2 wherein the plurality of pseudo-random number generators includes a plurality of linear feedback shift registers each coupled to receive a corresponding one of the plurality of encryption keys and wherein components of the plurality of encryption keys each specify an initial seed value and a polynomial function of one of the plurality of linear feedback shift registers.

4. The system of claim 1 wherein the key stream generator hardware includes a plurality of linear feedback shift registers each coupled to receive a corresponding one of the plurality of encryption keys and wherein components of the plurality of encryption keys each specify an initial seed value and a polynomial function of one of the plurality of linear feedback shift registers.

5. The system of claim 1 wherein the key river generator hardware includes a permutation transformation function that permutes an ordering of the bits for each key river symbol.

6. The system of claim 1 wherein at least one binary function of the key river includes a plurality of binary functions of the key river, each having an output, and the binary processor hardware includes:
  a selector that selects the output of the at least one binary function, based on components of the key river.

7. The system of claim 1, further comprising:
  block partitioning hardware, coupled to the binary processor hardware, that receives a password and partitions the password into a plurality of password segments, based on one or more of: an encryption control, codeword history data or the key path.

8. The system of claim 7 wherein the plurality of password segments have differing lengths, based on one or more of: an encryption control, codeword history data or the key path.

9. The system of claim 7 wherein the plurality of password segments have differing lengths, as a function of the password.

10. The system of claim 7 wherein a total number of the plurality of password segments is a function of the password.

11. A system comprising:
processing circuitry that includes:
key stream generator hardware that generates a plurality of key streams from a plurality of encryption keys, wherein each key stream comprises a repeating stream of key data;
key river generator hardware, coupled to the key stream generator hardware, that generates a key river by parallelizing the plurality of key streams as key river symbols, wherein bits from each key river symbol are selected from each key stream as individual bits from differing ones of the plurality of encryption keys; and
binary processor hardware, coupled to the key river generator hardware, that generates a key path as a sequence of binary digits generated from at least one binary function of the key river.

12. The system of claim 11 wherein the plurality of encryption keys include digital keys having at least one differing length.

13. The system of claim 11 wherein the key stream generator hardware includes a plurality of pseudo-random number generators each coupled to receive a corresponding one of the plurality of encryption keys and wherein components of the plurality of encryption keys each specify an initial seed value of one of the plurality of pseudo-random number generators.

14. The system of claim 13 wherein the plurality of pseudo-random number generators includes a plurality of linear feedback shift registers each coupled to receive a corresponding one of the plurality of encryption keys and wherein components of the plurality of encryption keys each specify an initial seed value and a polynomial function of one of the plurality of linear feedback shift registers.

15. The system of claim 11 wherein the key stream generator hardware includes a plurality of linear feedback shift registers each coupled to receive a corresponding one of the plurality of encryption keys and wherein components of the plurality of encryption keys each specify an initial seed value and a polynomial function of one of the plurality of linear feedback shift registers.

16. The system of claim 11 wherein the key river generator hardware includes a permutation transformation function that permutes an ordering of the bits for each key river symbol.

17. The system of claim 11 wherein at least one binary function of the key river includes a plurality of binary functions of the key river, each having an output, and the binary processor hardware includes:
a selector that selects the output of the at least one binary function, based on components of the key river.

18. The system of claim 11, further comprising:
block partitioning hardware, coupled to the binary processor hardware, that receives a password and partitions the password into a plurality of password segments, based on one or more of: an encryption control, codeword history data or the key path.

19. The system of claim 18 wherein the plurality of password segments have differing lengths, as a function of the password or a total number of the plurality password segments is a function of the password.

20. The system of claim 11 wherein at least one of the plurality of key streams is generated by a linear feedback shift register.

* * * * *